United States Patent
Barut et al.

(10) Patent No.: US 12,481,705 B1
(45) Date of Patent: Nov. 25, 2025

(54) NATURAL LANGUAGE SELECTION OF OBJECTS IN IMAGE DATA

(71) Applicant: Amazon Technologies, Inc., Seattle, WA (US)

(72) Inventors: Ahmet Emre Barut, Boston, MA (US); Chengwei Su, Belmont, MA (US); Weitong Ruan, Revere, MA (US); Wael Hamza, Yorktown Heights, NY (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/745,530

(22) Filed: Jun. 17, 2024

Related U.S. Application Data

(63) Continuation of application No. 17/031,062, filed on Sep. 24, 2020, now Pat. No. 12,045,288.

(51) Int. Cl.
*G06F 16/00* (2019.01)
*G06F 16/532* (2019.01)
(Continued)

(52) U.S. Cl.
CPC ...... *G06F 16/90332* (2019.01); *G06F 16/532* (2019.01); *G06F 16/583* (2019.01); *G06V 20/20* (2022.01); *G06N 20/00* (2019.01)

(58) Field of Classification Search
CPC .......... G06N 3/045; G06N 3/08; G06N 3/084; G06N 20/00; G06N 3/044; G06N 3/048; G06N 3/04; G06N 3/047; G06N 3/088; G06N 7/01; G06V 10/82; G06V 10/764; G06V 10/454; G06V 20/20; G06F 18/214; G06F 16/532; G06F 16/583; G06F 18/24; G06F 40/30; G06F 18/22; G06F 16/24578; G06F 18/217
See application file for complete search history.

(56) References Cited

U.S. PATENT DOCUMENTS 10,593,021 B1    3/2020  Shen et al.
11,030,763 B1 *  6/2021  Srivastava ............. G06T 7/593
(Continued)

OTHER PUBLICATIONS

Chen et al.; Semantic Image Segmentation With Deep Convolutional Nets and Fully Connected CRFs; 2015 conference paper at ICLR; 2015; 14 pgs.
(Continued)

*Primary Examiner* — Polina G Peach
(74) *Attorney, Agent, or Firm* — K&L Gates LLP

(57) ABSTRACT

Devices and techniques are generally described for selection of objects in image data using natural language input. In various examples, first image data representing at least a first object and first natural language data may be received. In some examples, first embedding data representing the first natural language data may be generated. Second embedding data representing the first image data may be generated. Relative location data indicating a location of the first object in the first image data relative to at least one other object may be generated. The first embedding data, the second embedding data, and the relative location data may be input into a multi-modal transformer model. The multi-modal transformer model may determine that the first natural language data relates to the first object.

20 Claims, 10 Drawing Sheets

(51) Int. Cl.
  *G06F 16/583* (2019.01)
  *G06F 16/9032* (2019.01)
  *G06V 20/20* (2022.01)
  *G06N 20/00* (2019.01)

(56) References Cited

U.S. PATENT DOCUMENTS

| | | | |
|---|---|---|---|
| 11,055,566 | B1 | 7/2021 | Pham et al. |
| 11,195,227 | B2 * | 12/2021 | Tufegdzic ............... G06V 20/20 |
| 2003/0097301 | A1 | 5/2003 | Kageyama et al. |
| 2011/0038512 | A1 * | 2/2011 | Petrou ................... G06F 16/532 382/118 |
| 2016/0042250 | A1 * | 2/2016 | Cordova-Diba ........... G06T 7/74 382/199 |
| 2017/0109930 | A1 | 4/2017 | Holzer et al. |
| 2017/0124432 | A1 * | 5/2017 | Chen ....................... G06N 5/04 |
| 2017/0200065 | A1 | 7/2017 | Wang et al. |
| 2017/0262995 | A1 * | 9/2017 | Li ........................... G06N 3/044 |
| 2018/0005082 | A1 | 1/2018 | Bluche |
| 2018/0089541 | A1 * | 3/2018 | Stoop ...................... G06V 20/30 |
| 2018/0107902 | A1 | 4/2018 | Yang et al. |
| 2018/0137551 | A1 * | 5/2018 | Zheng .................. G06F 18/214 |
| 2018/0350459 | A1 * | 12/2018 | Yang ....................... G06N 3/045 |
| 2019/0005069 | A1 * | 1/2019 | Filgueiras de Araujo ................... G06V 10/757 |
| 2019/0073353 | A1 | 3/2019 | Yu et al. |
| 2019/0080207 | A1 * | 3/2019 | Chang ................. G06F 16/7837 |
| 2019/0197154 | A1 * | 6/2019 | Cohen ................... G06F 16/583 |
| 2019/0311223 | A1 | 10/2019 | Wang et al. |
| 2019/0318405 | A1 | 10/2019 | Hu et al. |
| 2019/0332937 | A1 * | 10/2019 | Lin ....................... G06V 10/764 |
| 2020/0097764 | A1 * | 3/2020 | de Juan ................. G06F 16/532 |
| 2020/0151448 | A1 * | 5/2020 | Lin ........................ G06N 3/08 |
| 2020/0175053 | A1 | 6/2020 | Zheng et al. |
| 2020/0242152 | A1 | 7/2020 | Huang et al. |
| 2020/0257862 | A1 | 8/2020 | Kar et al. |
| 2020/0258276 | A1 * | 8/2020 | Ayush ....................... G06T 7/70 |
| 2020/0356829 | A1 | 11/2020 | Costabello et al. |
| 2020/0356842 | A1 * | 11/2020 | Guo ........................ G06V 20/20 |
| 2020/0357143 | A1 | 11/2020 | Chiu et al. |
| 2021/0027083 | A1 * | 1/2021 | Cohen .................. G06V 10/255 |
| 2021/0027098 | A1 * | 1/2021 | Ge ........................ G06F 18/217 |
| 2021/0110457 | A1 * | 4/2021 | Polanía Cabrera .... G06V 20/00 |
| 2021/0117737 | A1 * | 4/2021 | Ko .......................... G01V 1/01 |
| 2021/0122052 | A1 | 4/2021 | Stalz-John et al. |
| 2021/0224312 | A1 * | 7/2021 | Harikumar ............ G06F 16/532 |
| 2021/0232932 | A1 * | 7/2021 | Liu ....................... G06V 10/774 |
| 2021/0295115 | A1 * | 9/2021 | Wang ................... G06F 18/256 |
| 2021/0390700 | A1 * | 12/2021 | Lee ......................... G06F 18/25 |
| 2022/0067438 | A1 * | 3/2022 | Li .......................... G06N 3/044 |
| 2022/0215660 | A1 * | 7/2022 | Liu ....................... G06V 20/20 |

OTHER PUBLICATIONS

Fu et al.; Look Closer to See Better: Recurrent Attention Convolutional Neural Network for Fine-grained Image Recognition; 2017 Proceedings of the IEEE conference on computer vision and pattern recognition; 2017; p. 4438-4446.

* cited by examiner

NATURAL LANGUAGE SELECTION OF OBJECTS IN IMAGE DATA

CROSS-REFERENCE TO RELATED APPLICATIONS

This application is a continuation of and claims priority to U.S. patent application Ser. No. 17/031,062, filed Sep. 24, 2020, now U.S. Pat. No. 12,045,288. The disclosure of the foregoing application is incorporated herein by reference in its entirety.

BACKGROUND

Automatic speech recognition (ASR) combined with language processing techniques may enable a computing device to retrieve and process commands from a user based on the user's spoken commands. Natural language processing can be used to translate the spoken requests into semantic interpretations of the spoken command. Executable instructions are generated based on the semantic interpretation of the spoken command. The executable instructions are executed and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
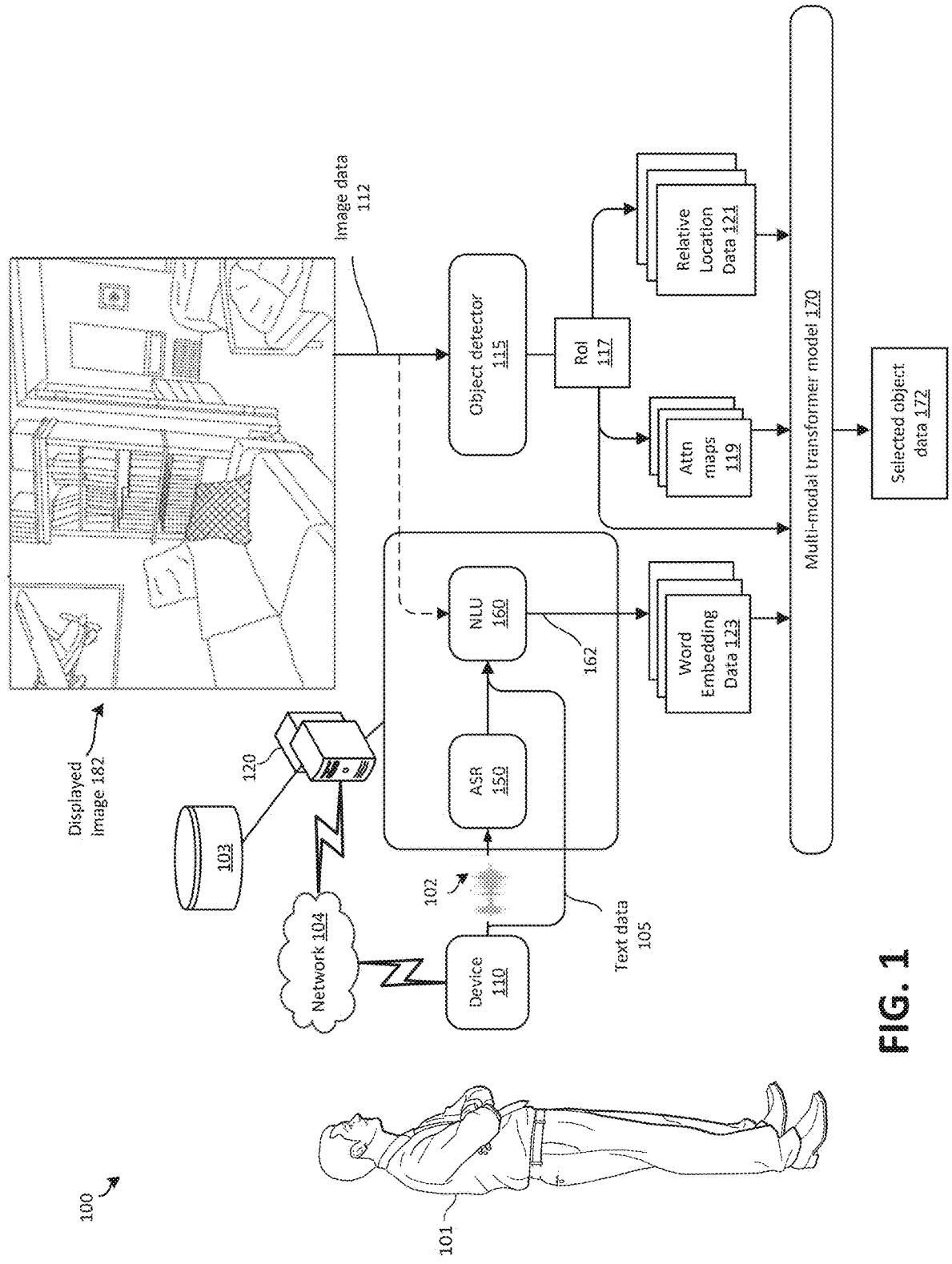
FIG. 1 is a diagram of a system configured to select objects in image data based on natural language input, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Generally, if a person wants to buy an item shown on a television show, movie, and/or other video, the person needs to know the name of the item or other identifying characteristics of the item. Then, the person either travels to a store that sells the item or performs a keyword search for the item on a seller's website or on an e-commerce site. However, the keyword search may not result in the correct item (or even a similar item) being located. In some examples, the person may not know the appropriate keywords to describe the object and/or to differentiate the object from other similar objects. Accordingly, it may be difficult for the person to locate an object that matches or is similar to the object depicted in the video.

In various other contexts, the user may want to know information about people, places, and/or objects depicted in images and/or video. Typically, unless metadata related to the depicted people, places, and/or objects is stored in association with the images and/or video, the person must perform independent research (e.g., using keyword searches, libraries, etc.) in order to learn further information about the subject.

Described herein are machine learning based systems and techniques that may be used to select objects in image data based on natural language inputs. For example, a user watching a movie may say "Computer, where can I buy that red handbag?" In response, image data representing one or more frames of image data of the movie that were displayed at the time the user's question was received may be sent as an input to one or more of the systems described herein. Additionally, natural language data representing the user's query ("Computer, where can I buy that red handbag?") may be sent as an input to one or more of the systems described herein. The one or more systems may be effective to determine the appropriate object/objects represented in the frames of image data referred to by the user's query. In the current example, the system may determine, based on the entity data "red handbag" in the natural language input and based on the portion of the image data representing the red handbag that the user's query refers to the red handbag depicted in the image data.

Additionally, the user's query may be parsed to determine that the user wants to buy the red handbag. Accordingly, visual feature data representing the red handbag of the image data may be used to perform a visual search for a matching and/or similar item, as described in further detail herein. Accordingly, the user may be provided with one or more item listings of handbags determined to be similar to the red handbag shown in the movie. Visual feature data may be a numerical representation of visual attributes and/or patterns in the image data and may thus be described as semantic visual features, as they are representative of the visual qualities of the image when rendered on a display.

In the above example, the selected object is used to search an e-commerce site for item listings. However, objects selected based on natural language and/or image data input, as described herein, may be used in a variety of other contexts. For example, a user may ask, "Computer, when was the actor wearing the blue shirt born?" After determining the relevant portion of the image data corresponding to the user's question (e.g., after determining a region of the image data corresponding to the "actor wearing the blue shirt"), a face recognition algorithm may be used and/or a lookup operation may be used to determine the name of the actor corresponding to the region of the image data. Thereafter, a graph database search may be performed to determine when the depicted actor was born.

In another example, the selected object may be used to navigate a user interface and/or otherwise interact with a graphical user interface. For example, a child may be viewing a graphical user interface depicting children's movies. The child may use a request such as "Play the movie with the blue robot." The various systems and techniques described herein may be effective to determine the most likely on-screen object that pertains to the child's request. For example, the various systems and techniques described herein may determine that the child is referring to a particular movie icon displayed on screen that depicts a blue robot. The various systems and techniques may further determine that the child wants to play the movie with the blue robot movie icon. Accordingly, the various systems and techniques may be effective to begin playback of the correct movie in response to the child's request. Various other navigation and/or interactions are possible. For example, such interactions may include zooming on a particular object, displaying and/or otherwise outputting metadata related to a particular object, panning toward a particular object, and/or performing any requested action with respect to a particular object that is displayed on screen.

In some other examples, the user may select content an item displayed as part of an augmented (or virtual) reality display. In augmented reality (AR), digital content may be inserted into a camera feed of the physical environment such that the content appears to be part of the physical environment. For example, image data depicting furniture may be displayed overlaying a camera feed of a user's home so that the user may see what the furniture looks like within the user's home. The various techniques described herein may be used to select and/or interact with content displayed as part of the virtual reality display, as well as content displayed as part of the video being captured by the camera. For example, a user may use speech to select and/or interact with an object appearing in AR (and/or virtual reality). Accordingly, object detection may be used to detect and/or classify objects captured by the user's camera so that the user may learn more information about those objects, purchase similar (or the same) object, etc. In other examples, a user may use natural language (e.g., speech, such as through a voice assistant) to interact with objects depicted in live video (e.g., video being captured by a camera of the user's smartphone), pre-recorded video, and/or image data captured by a device on which the voice assistant (or other natural language processing system) is executing. Accordingly, the various techniques described herein are not limited to pre-recorded image/video data or real-time capture/display of image/video data, but instead may be used in any scenarios where a natural language processing system is able to receive and interact with image and/or video data.

As used herein, the term "object" may refer to any perceivable image data displayed on a screen. For example, an object may refer to a person, place, and/or thing represented by one or more pixels of the relevant image data. Objects may be displayed as part of a still image and/or as part of a video. A video, as described herein, refers to video data comprising a series of frames of image data. An individual frame of image data may comprise a two-dimensional grid of pixels. Each pixel may be associated with a pixel value (e.g., a luminance value, chrominance value, color value for RGB, etc.). Furthermore, various pixels may be represented as visual feature data using various image processing techniques described herein. Visual feature data refers to data that represents the image and the various details of objects depicted in the image in a space associated with the visual feature.

In various examples, object detectors are machine learning models that locate and/or classify objects detected in frames of image data. Typically, the output of an object detector model is a "bounding box" or "region of interest" surrounding a group of pixels and a label classifying that bounding box or region of interest to a particular class for which the object detector has been trained. For example, an object detector may be trained to classify dogs and cats. Accordingly, if an input image includes first pixels representing a dog and second pixels representing a cat, the object detector may output two bounding boxes (e.g., output bounding box data). The first bounding box may surround the first pixels and may be labeled as "dog." Similarly, the second bounding box may surround the second pixels and may be labeled as "cat." Bounding boxes may be of any shape. For example, bounding boxes are rectangular and may be defined by the four pixels addresses that correspond to the corners of the bounding box. In some examples, bounding boxes are defined by a perimeter of pixels surrounding pixels predicted to correspond to some object which the object detector has been trained to detect. More generally, object detectors may detect regions of interest (RoIs). Bounding boxes are one example of an RoI that may be detected by an object detector. However, RoIs may be defined in other ways apart from bounding boxes. For example, pixels corresponding to a detected object may be classified to distinguish these pixels from those pixels representing other objects. Since object detectors typically are not 100% accurate and/or because detected objects are typically not rectangular (and thus cannot be perfectly bounded using a rectangular bounding box), some pixels within a bounding box may not correspond to the identified object. Similarly, some pixels outside of a bounding box may, in reality, pertain to the classified object despite not being within the bounding box. Further, in some examples, object detectors may misclassify objects (e.g., a dog may be labeled as a cat, and vice versa).

Automatic speech recognition (ASR), as described herein, is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language. In many examples, the natural language input data (e.g., a user utterance and/or input text) may result in specific semantic intent data representing a semantic interpretation of the text. In some examples, the semantic intent data is actionable to cause the natural language processing system and/or a natural language processing application (e.g., a "skill") to perform an action. Generally, semantic intent data may represent a goal of a user in making the particular utterance. In some examples, the semantic intent data may include executable commands or other type of instructions that may be used to take some action related to the speech processing system's understanding of the user's request. Thereafter one or more of the semantic intents may be selected for further processing and/or output by the NLU system. For example, the semantic intent associated with the highest confidence score among the different semantic intents generated may be selected for further processing and/or output.

Text-to-speech (TTS) is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a natural language processing system ("input data") may be described by "natural language inputs" and/or simply "inputs." Such request data may change forms many times during processing of the request data by various components of the speech processing system. For example, initially the input data may be audio data and/or input text data representing a user question. The audio data may be transformed into text data and/or other ASR output data by an ASR component of the speech processing system. The text data and/or other ASR output data may be transformed into intent data by an NLU component of the speech processing system. For example, the declarative intent may be determined for natural language inputs that are not directly actionable (declarative utterances).

For typical, actionable inputs, intent data may be used by a speech processing application (e.g., a skill) to perform an action (e.g., to generate action data and/or other skill output that may be processed in order to take some corresponding action such as answering a user's question, playing video, playing audio, etc.). Natural language inputs may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Such applications may include speech processing skills, and/or other types of speech processing software. Generally, as used herein the term "skill" may be used to refer to any code executing on a device that is effective to generate an action in response to a natural language input.

In various examples, speech processing systems may determine an intent for particular natural language input according to an interpretation of the natural language input determined by NLU. In various examples, multiple NLU process flows may be executed for a given natural language input, as some process flows may be more effective in deriving semantic meaning from particular types of utterances and/or other natural language inputs. For example, a primary NLU process flow may comprise a rule-based heuristic system utilizing knowledge graphs and/or ontological configurations that have been coded in advance. The primary NLU process flow may use a process known as named entity recognition (NER) to identify entities (e.g., nouns and/or pronouns) in a given natural language input. The entities and/or other semantic language data of a natural language input may be parsed and sent to the knowledge graph, which, in turn, may be used to relate different entities and/or attributes of those entities (data describing characteristics of the entities) to one another.

In various examples, NLU systems and/or components described herein may be multi-modal as the NLU systems may be effective to process other types of inputs besides input natural language data (e.g., text and/or speech). For example, multi-modal NLU systems may be effective to process image data and/or video data to determine visual feature data that semantically represents objects included in the image data. As described in further detail below, multi-modal transformer models may be machine learned models that are effective to take both natural language data and image data as inputs in order to perform some task. In various examples described herein, multi-modal NLU systems may be effective to determine one or more objects in image/video data that are referred to in a natural language input. In various examples, multi-modal NLU systems may be effective to take other inputs besides natural language data and image data. For example, NLU systems may be effective to receive movement data (e.g., accelerometer data, gyroscope data, haptic data, telemetry data, depth sensor data, etc.) and may determine intent data and/or select objects in image data based on such data.

In various examples, instead of using multi-modal NLU systems, skills may be used to perform the various techniques for object selection based on natural language inputs described herein. For example, an NLU system may generate NLU output data (e.g., word embeddings) for a natural language input. The NLU output data may be sent to a skill as an input to a multi-modal transformer model executed by the skill. Additionally, image data that corresponds to the natural language input (e.g., image data displayed at the time at which the natural language input was received and/or which displayed slightly before the natural language input was received (to account for latency/processing, etc.)) may be sent to an object detector, as described herein. Regions of interest representing the detected objects along with the various attention map data and relative location data described herein may be sent as inputs to the multi-modal transformer model executed by the skill along with the word embeddings. The multi-modal transformer model may generate output data indicating a particular object in the image data that is implicated (e.g., referred to) in the natural language input. Thereafter, the output data may be used (e.g., as entity data) by the speech processing system to perform an action requested by the natural language input.

For example, the natural language input may be "Computer, zoom in on that car on the right." The multi-modal transformer model may determine a region of the image data that corresponds to a car depicted on the right side of the frame of image data based at least in part on the natural language input. Thereafter, a skill may be invoked that performs a zoom operation on a selected region of image data. The region of the image data that corresponds to the car may be passed as an input parameter to the skill and the skill may perform the zoom operation to zoom in on the image of the car.

Figure 3:
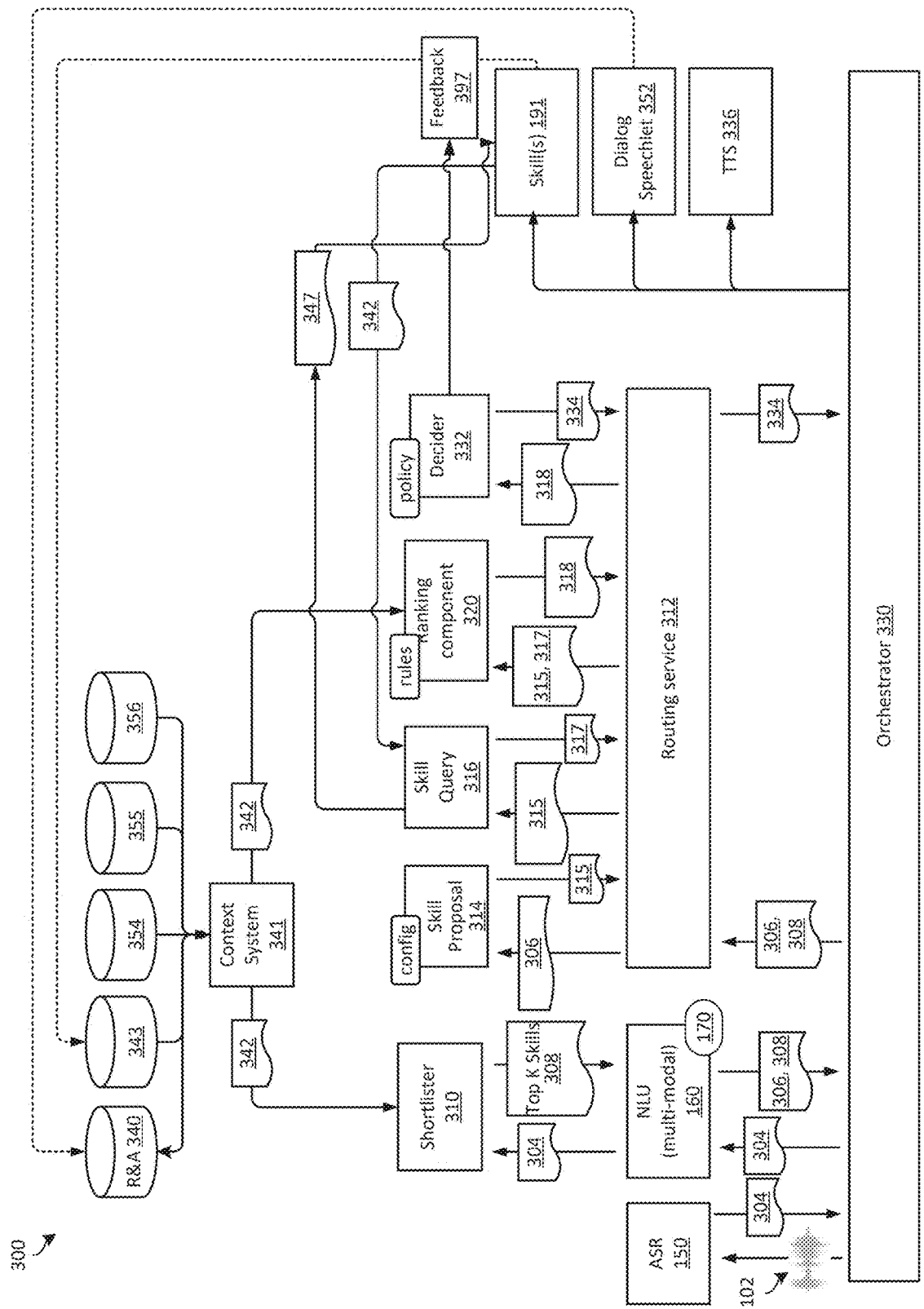
FIG. 3 is a block diagram illustrating an example speech processing system that may be used to determine embedding data used for object selection, in accordance with embodiments of the present disclosure.

FIG. 1 is a diagram of a system 100 configured to select objects in image data based on natural language input, according to various embodiments of the present disclosure. In various examples, a user 101 may communicate with a local device 110 (e.g., a natural language processing-enabled device 110). Local device 110 may be a speech-processing enabled device and may be effective to continually "listen" for a wake word. Upon detection of a wake word, input device 110 may record and send audio over network 104 to a natural language processing system 120. Natural language processing system 120 may include one or more computing devices effective to perform various techniques to generate a semantic interpretation of natural language input data and generate responses thereto. Natural language processing system 120 may include fewer or additional components apart from those specifically shown and described in FIG. 1. For example, FIG. 3 depicts an example of a more detailed natural language processing system that may be used in accordance with various aspects of the present disclosure. Memory 103 may represent at least one non-transitory computer-readable memory storing instructions that are effective to implement one or more of the various techniques and/or machine learned models described herein. Additionally, memory 103 may store data described herein, such as one or more model parameters, query data, result data, training data, etc.

Although natural language processing system 120, object detector 115, and multi-modal transformer model 170 are depicted as separate components in FIG. 1, in some examples embodiments, natural language processing system 120, object detector 115, and multi-modal transformer model 170 may be implemented by device 110. Accordingly, natural language processing and selections of objects in image data using natural language input may be performed locally on device 110 (e.g., at an edge-based client device). In some other implementations, one or more of natural language processing system 120, object detector 115, and multi-modal transformer model 170 may be implemented locally by device 110 while the remainder of the components may be executed remotely by a device configured in communication with device 110.

In the example of FIG. 1, user 101 may be watching a video (or may be viewing a still image). The user 101 may say "Computer, zoom in on the blue chair on the right." Accordingly, audio data 102 may represent the user's query. The displayed image 182 may be one or more frames of image data (of the video that the user is watching) corresponding to the time at which the audio data 102 is received. In some examples, the device displaying the displayed image 182 may be local device 110 (e.g., the same device that receives the input text data 105 and/or the audio data 102 representing the user 101's query). However, in other examples, the device displaying the displayed image 182 may be different from input device 110. In some examples, the frames of displayed image 182 that are sent for further processing may be determined in such a way as to account for latency and/or processing time of the user's utterance. For example, it may take 200 ms to receive the audio data 102 by the natural language processing system 120. Accordingly, the image data 112 sent for further processing may be a frame of image data of the video that is 200 ms prior to a timecode of the video at which the audio data 102 (or text data 105) was received. As such, the image data 112 may correspond to a time at which the user 101 began to speak and/or type the user's query. In various examples, the video watched by user 101 may be paused when the user speaks and/or otherwise inputs the user 101's query.

In an example, audio data 102 representing a user query may be sent over network 104 to natural language processing system 120. Network 104 may be a wide area network (WAN), such as the Internet, or may be a local area network (LAN). In various other examples, input device 110 may be configured to receive text data and/or may perform speech recognition locally. In such examples, input device 110 may send text data 105 representing natural language input data over network 104 to natural language processing system 120.

In various examples, the audio data 102 may be sent by the natural language processing system 120 to ASR component 150. ASR component 150 may generate text data representing the audio data. The text data representing the audio data 102 may be sent to NLU component 160. In examples where user 101 provides text input and/or where the input device 110 generates and sends text representing a user utterance, text data 105 may be sent to NLU component 160.

NLU component 160 may employ a number of different natural language understanding strategies in order to understand natural language input data. In various examples, if NLU component 160 is multi-modal, image data 112 (representing the image data corresponding in time with the audio data 102) may be sent to NLU component 160. In such examples, the multi-modal NLU component 160 may be effective to generate not only the word embedding data 123 representing the user's utterance, but also the region of interest data 117 (comprising visual feature data representing a predicted object-of-interest), attention maps 119 (e.g., attention map data), and relative location data 121, as described in further detail below. In various other examples, NLU component 160 may generate word embedding data (or other token embeddings) representing the user's utterance. For example, a pre-trained language model (such as a bi-direction long short term memory (LSTM) model, transformer model, and/or a gated recurrent unit (GRu) system may be used to generate word embedding data semantically representing the user's utterance. In various examples, the NLU output data 162 may be the word embedding data 123 representing the user 101's utterance (or text data 105). In other examples, NLU output data 162 may be processed to generate the word embedding data 123 (in order to provide the proper data format for input into multi-modal transformer 170).

Image data 112, corresponding to the user's utterance and/or input text data 105 may be sent to object detector 115. Object detector 115 may comprise a convolutional neural network (CNN) that may generate visual feature data semantically representing objects depicted in the image data 112.

For example, various low level features (e.g., edges) may be detected by a first convolutional layer of the CNN and various higher-level features (e.g., shapes) may be detected by a later convolutional layer of the CNN. A neural network classifier (e.g., a fully connected layer) of the object detector 115 may receive the output from the CNN (e.g., visual feature data representing the various objects depicted in the image data 112) and may detect and classify objects based on the input visual feature data. The output of the object detector 115 may be region of interest (RoI) 117. RoI 117 may be visual feature data representing the object detected in image data 112 in a latent feature space. For example, if object detector 115 is trained to detect chairs and couches, object detector 115 may generate two RoIs-a first RoI comprising visual feature data representing the couch depicted on the left in displayed image 182 and a second RoI comprising visual feature data representing a chair displayed on the right in displayed image 182.

As described in further detail below, for a given RoI 117, visual feature data (e.g., visual feature embedding data) representing the RoI 117 may sent to multi-modal transformer model 170 (together with the word embedding data 123). Additionally, a dual attention mechanism may be applied to visual feature data representing RoI 117. A spatial attention mechanism of the dual attention mechanism may generate a plurality of groups of visual feature data—with each group representing the RoI 117, albeit with different visual features of the RoI 117 emphasized for the particular group. The term "group" as used in the context of spatial and/or channel attention refers to a particular RoI. Each group generated using the spatial attention techniques described herein may be a separate attention map. The spatial attention mechanism is described in further detail below, in reference to FIG. 4. Additionally, a channel attention mechanism may be applied on a per-channel basis (e.g., for each channel of the CNN of object detector 115) to the attention maps output by the spatial attention mechanism to generate modified attention maps (for each group of the RoI 117). Embedding data representing the modified attention maps (generating using spatial and channel attention) may be generated and sent as an input to the multi-modal transformer model 170 together with the word embedding data 123 and the embedding data representing the original RoI 117.

Additionally, relative location data 121 may be generated based on RoI 117. The relative location data 121 may describe the spatial offset (offset data) between the object of RoI 117 and other objects in image data 112 and detected by object detector 115. Embedding data representing the relative location data 121 may be generated and may be input into multi-modal transformer model 170 together with the word embedding data 123, the embedding data representing the original RoI 117, and the embedding data representing the modified attention maps.

As described in further detail below, multi-modal transformer model 170 may generate a probability score indicating a probability that the input query (e.g., the user utterance and/or input user text) corresponds to the object represented by the RoI 117. In various examples, a softmax layer may be used to generate the probability of the input query corresponding to each candidate object detected by the object detector 115. Accordingly, the selected object data 172 may represent the candidate object with the highest probability.

Multi-modal transformer model 170 may be implemented by NLU component 160 (in the case where NLU component 160 is multi-modal). However, in some other examples, multi-modal transformer model 170 may be implemented as a separate system (e.g., by a skill) in communication with NLU component 160. The selected object data 172 may be sent back to NLU component 160 and/or to some other component of natural language processing system 120 to take an action requested in the input query (e.g., an action requested in the user utterance). For example, if the user query is "Computer, zoom in on the blue chair on the right," the selected object data 172 may represent a blue chair on the right side of displayed image 182. The image data (e.g., visual feature data and/or pixel data representing the blue chair) may be sent to natural language processing system as entity data related to the input query, for example. Thereafter, the NLU component 160 may determine an intent related to the user query (e.g., a zoom-in intent). Data representing the intent, the entity data representing the blue chair, and/or the image data 112 may be sent to a skill effective to perform the zoom-in action in response to the intent. Accordingly, the skill may zoom in on the blue chair and the modified, zoomed-in image of the blue chair may be displayed on the user's display.

Figure 2:
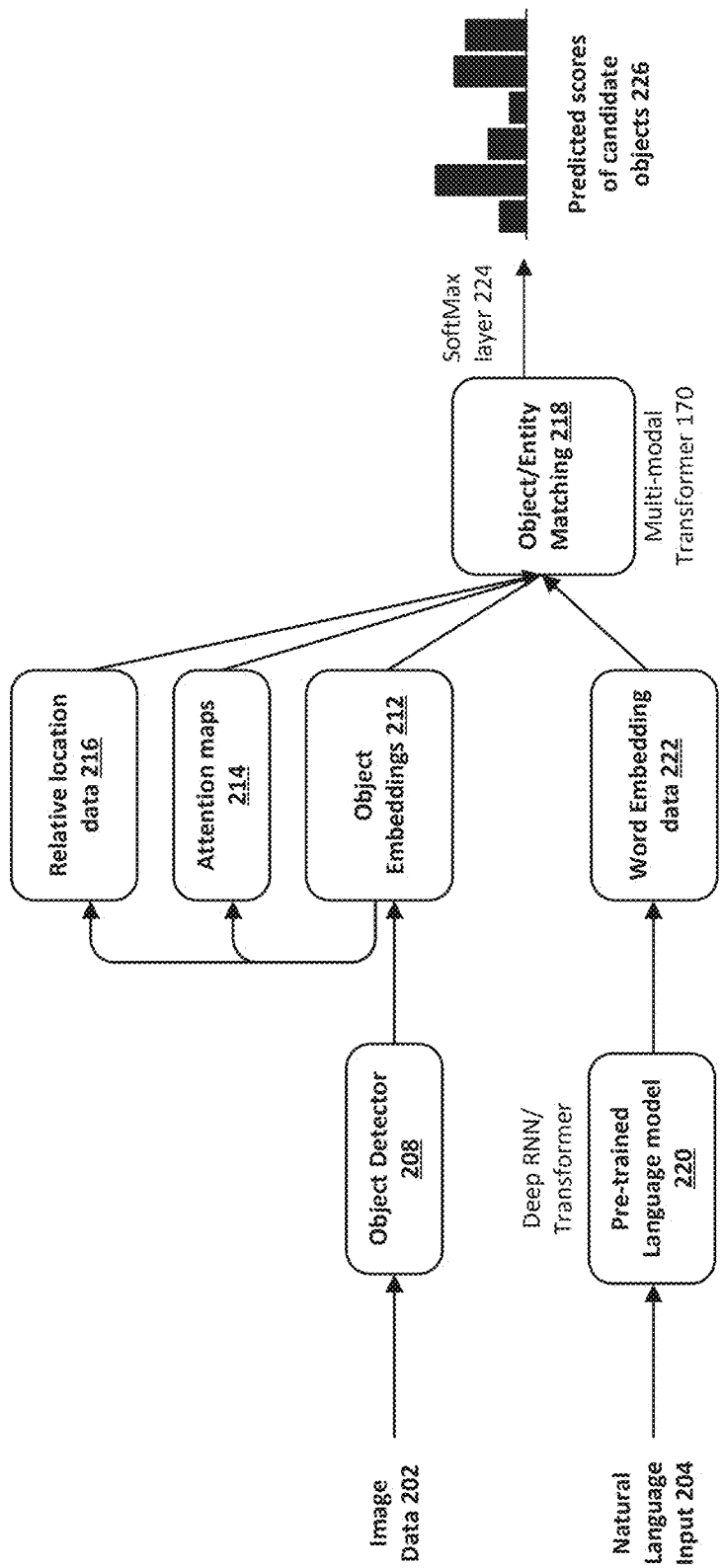
FIG. 2 depicts a flow diagram illustrating example operations that may be used to select objects in image data based on natural language input, in accordance with various embodiments of the present disclosure.

FIG. 2 depicts a flow diagram illustrating example operations that may be used to select objects in image data based on natural language input, in accordance with various embodiments of the present disclosure. Image data 202 and natural language input 204 may be received (e.g., from device 110 of FIG. 1). The natural language input 204 may represent a user query that refers to some object(s) represented by a portion of image data 202.

A language model may be used to determine word embedding data 222 that semantically represents the natural language input. In various examples, the language model may be a pre-trained language model 220 that may be fine tuned for input into the multi-modal transformer 170. In various examples, the pre-trained language model 220 may be a deep recurrent neural network, a transformer (e.g., bi-directional encoder representations for transformers (BERT)), a bi-LSTM, etc. Various language models effective to generate embedding data semantically representing natural language inputs are known. Any such language model (whether or not pre-trained) may be used in accordance with the present disclosure. The word embedding data 222 (and/or subword embeddings) may be input into the multi-modal transformer 170, which may perform object/entity matching 218.

Image data 202 may be input into object detector 208. As previously described, the image data 202 may be selected so as to correspond to (e.g., be contemporaneous with) the natural language input 204. For example, if a user is watching a video and utters a spoken query the image data may correspond to one or more frames that were displayed to the user during the time at which the user began to speak the query.

As previously described, object detector 208 may be a pre-trained object detector that may comprise a CNN that generates visual feature data representing the input image data 202. Object detector 208 may comprise a classifier that may be trained to detect and classify objects represented in the image data 202 on the basis of the visual feature data representing the input image data 202.

Object detector 208 may output RoI data representing objects detected in the input image data 202. The RoI data may comprise visual feature data that semantically represents the objects depicted in the image data 202. Each RoI may be used to generate an object embedding 212 that may be input into the multi-modal transformer 170 to perform object/entity matching 218. The object embeddings 212 may, for example, be generated by down-sampling the visual feature data representing the RoI.

In addition, each RoI may be used to generate attention maps 214. As described in further detail below in reference to FIG. 4, spatial and channel attention may be used to generate the attention maps 214. For a given RoI, the attention maps 214 may represent various visual semantics of the object represented by the RoI. For example, an attention map may represent a certain color, a particular visible attribute, a particular visual pattern, etc. The attention maps 214 may be input into multi-modal transformer 170 as embeddings (together with the various other inputs described herein).

Similarly, for each RoI, relative location data 216 may be generated describing the RoI's location offset with respect to adjacent objects in the input image data 202. The relative location data 216 models the spatial relationships between the different objects represented in the input image data 202. The relative location data 216 may be input into multi-modal transformer 170 as embeddings (together with the various other inputs described herein).

The multi-modal transformer 170 may include a Softmax layer 224 that may generate predicted scores of candidate objects 226. A predicted score is a probability indicating that an entity referred to in the natural language input 204 refers to the particular candidate object (e.g., an RoI output by the object detector 208). Accordingly, in some examples, the highest score may be selected as the object represented in the image data 202 to which the natural language input 204 was referring. Data representing the selected object may be used for further processing. For example, NLU intent data determined from the natural language input 204 may be used to perform some action on the object. Examples may include visual search for products using the data representing the object as a search input, selection of the object on a GUI (and generating control input data effective to select the object on the GUI), determining metadata concerning the object, determining an identity of the object, etc.

FIG. 3 is a block diagram illustrating an example speech processing system that may be used to determine embedding data used for object selection, in accordance with embodiments of the present disclosure.

FIG. 3 is a block diagram illustrating an example speech processing system that may be used to determine embedding data used for object selection, according to various embodiments of the present disclosure. The various components illustrated in FIG. 3 may be located on the same or different physical devices. The various components illustrated in FIG. 3 may be components of natural language processing system 120. Communication between various components illustrated in FIG. 3 may occur directly or across a network. A speech processing-enabled device may capture audio using an audio capture component, such as one or more microphone(s). The speech processing enabled device may send audio data 102 (e.g., corresponding to an utterance) to an orchestrator 330 of the speech processing system 300. The speech processing enabled device may also send metadata (e.g., including device identifiers, device type data, contextual data, IP address data, room location data, etc.) to the orchestrator 330. The components depicted in FIG. 3, including components of a speech processing system may be generally referred to as spoken language processing components, a speech processing system 300 a spoken language processing system, speech processing components, and/or a speech processing routing system. Additionally, in various examples, the components depicted in FIG. 3 may process written input (e.g., text data) in addition to spoken input.

Upon receipt by the speech processing system 300, the audio data 102 may be sent to an orchestrator 330. The orchestrator 330 may include memory and logic that enables the orchestrator 330 to initiate a dialog session and to transmit various pieces and forms of data to various components of the system, as described in further detail below.

The orchestrator 330 may send the audio data 102 to an ASR component 150 (e.g., a speech recognition component). The ASR component 150 may transcribe the audio data 102 into one or more hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data 304 generated thereby to orchestrator 330 that may, in turn, send the text data 304 to NLU component 160. As previously described, the text data 304 may include one or more ASR hypotheses. The text data 304 may include a top scoring hypothesis of the speech represented in the audio data 102 or may include an N-best list including a group of hypotheses of the speech represented in the audio data 102, and potentially respective ASR processing confidence scores. As previously described, in some other examples, the ASR component 150 (and/or other components of the speech processing system 300) may generate other metadata associated with the utterance such as an overall utterance confidence score, per-word (e.g., per token) confidence scores for the utterance, utterance duration, stream duration (e.g., duration of the stream of audio data from speech processing enabled device to speech processing system 300), a number of tokens output by ASR, etc.

The NLU component 160 attempts to make a semantic interpretation of the phrases or statements represented in the text data input therein. That is, the NLU component 160 determines one or more meanings associated with the phrases or statements represented in the text data 304 based on individual words represented in the text data 304. The NLU component 160 interprets a text string to derive an intent of the user (e.g., an action that the user desires be performed and/or a state described by the user) as well as pertinent pieces of information in the text data that allow a device (e.g., the speech processing enabled device, the speech processing system 300, a computing device(s) implementing a skill, etc.) to complete the intent. For example, if the text data 304 corresponds to "Set temperature to 74 degrees," the NLU component 160 may determine the user intended to invoke a climate intent with a target temperature value slot of 74 degrees Fahrenheit. A federated NLU approach may be employed in which a number of different NLU strategies are used to determine various NLU output data. The NLU output data may be ranked and the best output (and/or a list of the best NLU outputs) may be sent to downstream components. As previously described, in addition to the NLU intent and slot data, the NLU component 160 may generate other metadata associated with the utterance (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the NLU component 160 (depicted in FIG. 3 as "NLU 160") is referred to as NLU output data 306. In various examples, NLU component 160 may be a multi-modal NLU component and may receive image data (e.g., one or more frames of a video) in addition to the text data 304 that corresponds to the image data.

In various examples, a multi-modal NLU may generate embedding data representing both the natural language input (e.g., text data 304) and the input image data (e.g., image data 112 of FIG. 1). The embedding data representing the natural language input and the input image data may be sent to a multi-modal transformer (e.g., multi-modal transformer 170 described above) that may be effective to determine an object in the image data that is indicated by the natural language input (e.g., text data 304). The selected object (e.g., data representing the selected object) may thereafter be used as slot data and/or as a named entity that may be used to perform various actions requested by the natural language input (and determined by NLU component 160 as intent data, as described herein). Accordingly, NLU output data 306 may comprise data representing the selected object selected by the multi-modal transformer 170.

NLU component 160 may send the text data 304 and/or some of NLU output data 306 (such as intents, recognized entity names, slot values, etc.) to a shortlister 310. The shortlister 310 may comprise one or more machine learning models that may be effective to predict a subset of skills that are most likely to be able to correctly process the input data, based on the input of the text data 304 and/or the NLU output data 306. In addition, the shortlister 310 may call the ranking and arbitration component 340 to request features pre-computed by the ranking and arbitration component 340 according to features used as inputs by the machine learning models of shortlister 310. As previously described, the shortlister 310 may define source data used to compute the features and/or may specify functions used to generate the features from the source data (e.g., formulae and/or functions) prior to runtime processing of input data. The ranking and arbitration component 340 may precompute the features according to the specified feature definitions supplied by shortlister 310 and by the other components of speech processing system 300 and may store the precomputed features in memory. Ranking and arbitration component 340 may generate indexes that may be used to retrieve the precomputed features during runtime (e.g., through an API). Accordingly, during runtime processing, shortlister 310 may retrieve the precomputed features from ranking and arbitration component 340 and may use the precomputed features (among other inputs) to predict a subset of skills that are most likely to be appropriate to process the current input data. Additionally, the ranking and arbitration component 340 and/or shortlister 310 may determine that skill related to multi-modal intents is appropriate to process the current input data.

Shortlister 310 may send the top K skills 308 to NLU component 160. NLU component 160 may thereafter perform skill-specific NLU processing (and/or question-and-answer processing by a question and answer NLU component) for the skills in the top K skills 308 to determine skill-specific intents, slots, and/or named entities. NLU output data 306 may include such skill-specific data (e.g., skill-specific N-best hypotheses).

Ranking and arbitration component 340 may communicate with various systems in order to obtain source data used to precompute features. For example, ranking and arbitration component 340 may communicate with feedback storage 343 to receive user feedback data (e.g., explicit and/or implicit user feedback related to user satisfaction with processing of input data). In various examples, the user feedback data may be user-specific and/or device specific and may indicate whether a user was satisfied or not satisfied with a particular interaction with speech processing system 300. As previously discussed, in various examples user feedback data may be predicted for input data prior to processing the input data using a skill 191. In various examples, user feedback data may be used to pre-compute various features used by machine learning models of speech processing system 300. Accordingly, in some examples, the skills selected for processing particular input data may be determined based at least in part on skills that a user (or a group of similar users) has responded positively to in the past.

Additionally, ranking and arbitration component 340 may communicate with endpoint context system 354, which may provide context data at the conclusion of a user interaction with the speech processing system 300. In another example, ranking and arbitration component 340 may communicate with skill data 356 to determine information from the skill regarding past interactions with the skill and/or data acquired by the skill. Additionally, ranking and arbitration component 340 may communicate with other data sources 355, as new services are added and/or as new data types that may be useful for routing prediction are made available. In addition to ranking and arbitration component 340 using context data 342 to precompute features used by various machine learning models of the routing architecture of the speech processing system 300, a context system 341 may receive the context data 342. The context system 341 may provide the context data directly to both ranking and arbitration component 340 as well as to various components of the routing architecture of speech processing system 300. For example, the context system 341 may send context data 342 to shortlister 310 and/or ranking component 320 in order to determine a shortlist of skills 191 for particular input data and/or in order to rank the shortlisted skills.

NLU output data 306 (which may, in some examples, include data representing the object selected by the multi-modal transformer 170) and top K skills 308 may be sent by NLU component 160 to orchestrator 330. Orchestrator 330 may send the top K skills 308 and the NLU output data 306 to routing service 312. Routing service 312 may send the top K skills 308 and NLU output data 306 to skill proposal component 314. Skills 191 may subscribe to particular intents using skill proposal component 314.

Accordingly, skill proposal component 314 may receive the NLU output data 306 and may determine whether any of the included intents correspond to one or more of skills 191. If so, skill proposal component 314 may generate candidate data comprising <Intent, Skill> candidate pairs 315. In various examples, the intent in the candidate pairs may include named entity data and/or data representing a selected object selected by multi-modal transformer 170. The candidate pairs 315 may be sent to routing service 312 and may be sent by routing service 312 to skill query service 316. Skill query service 316 comprises an API through which skills 191 may "opt out" of particular requests. For example, a skill 191 may comprise a video playback skill. Accordingly, the skill 191 may register with skill query service 316 to indicate that only requests made on a device with a display screen should be routed to the particular skill 191. In addition, skills 191 may communicate availability information, pricing information, and/or other structured descriptions of how and under what circumstances (e.g., determined using context data) the skill 191 can fulfill a request represented by the current input data. Skill query service 316 may send a signal 317 indicating what skills can fulfill a particular request (and/or what skills are unable to fulfill the request). The signal 317 may be sent to routing service 312. Routing service 312 may send the signal 317 along with the candidate pairs 315 to a ranking component 320. As depicted in FIG. 3, skills 191 may send context data 342 to skill query service 316 to indicate situations in which a skill may opt out of processing a particular request (e.g., if the device sending the input data does not include a display screen, etc.). In various examples, the context data 342 sent by skills 191 to skill query service 316 may be skill and/or request specific context data. Additionally, skill query service 316 may send intent requests 347 to skills 191.

Ranking component 320 may include one or more statistical machine learning models effective to rank the candidates included in candidate pairs 315. In order to rank the candidate pairs 315, ranking component 320 may generate confidence scores for each corresponding candidate pairs 315. A confidence score may indicate that the corresponding skill 191 and/or intent of the candidate pair is appropriate to process the request. Ranking component 320 may compute features using the candidate pairs 315 and signal 317 in order to predict the ranking of the skills 191 included in the candidate pairs 315. The features computing during processing of the input data (sometimes referred to as "runtime features") may comprise a feature representation of the list of candidate pairs 315 and/or a representation of the signal 317. Additionally, ranking component 320 may query ranking and arbitration component 340 for precomputed features that have been defined for use by ranking component 320. As previously described, the precomputed features may be determined based on contextual data, user feedback data, past usage data, skill data, previous rankings of ranking component 320, etc. Additionally, ranking component 320 may compute runtime features using context data 342, user feedback data from feedback storage 343, and/or other data sources. In various examples, the loss function for the machine learning models of ranking component 320 may optimize based on user satisfaction scores computed using user feedback data from feedback storage 343.

Ranking component 320 may generate a ranked list 318 of the candidate skills indicated in candidate pairs 315. In at least some examples, the ranking component 320 may use a deep neural network as a machine learning model for determining the ranked list 318. In some examples, ranking component 320 (and/or some other speech processing system 300 component, such as decider engine 332) may determine plan data that may override the ranked list 318 such that a lower ranked skill among the candidate pairs 315 may be selected for processing the input data.

In another example, the decider engine 332 may store policies that may control whether or not explicit user feedback is solicited (e.g., via TTS) after the completion of an action (e.g., by the top-ranked skill determined by the ranker component). Explicit feedback may be solicited through the dialog skill 352 prior to routing input data to a skill for processing. In another example, decider engine 332 may control feedback component 397 to request explicit feedback from a user post-skill processing (e.g., via TTS). In various examples, feedback component 397 may ask the user whether the user was satisfied with the action taken by the speech processing system 300. In yet another example, an exploration policy defining a dynamic routing adjustment may send input data that matches predicate data defined using the dynamic routing adjustment component to a newly implemented skill 191. The decider engine 332 may determine that the top ranked result from the ranking component 320 should be ignored due to the dynamic routing adjustment being performed by the dynamic routing adjustment component. Additionally, in some examples, a policy of the decider engine 332 may be to solicit explicit feedback from the user whenever a new skill is routed to due to a dynamic routing adjustment. Accordingly, at the completion of the action, the decider engine 332 may control TTS to inquire as to whether the user was satisfied with the interaction with the new skill and/or whether the performed action was the action intended by the user.

Decider engine 332 may output plan data that comprises a routing plan 334 for processing the input data. The routing plan 334 may define a target skill 191 to process the input data. As described above, the target skill 191 may be selected as the top-ranked hypothesis determined by the ranking component 320. In some other examples, the decider engine 332 may select a target skill 191 based on a policy, as described above. In some examples, the ranking component 320 may determine that two different skills are equally applicable for processing the input data. In such examples, the decider engine 332 may determine that disambiguation should occur. Accordingly, the routing plan 334 may include sending the input data to a dialog skill 352 that may output (via TTS) one or more questions (e.g., a disambiguation request) used to prompt the user to disambiguate between the two equally likely (or approximately equally likely) interpretations of the input data. For example, it may be unclear, based on a user's request, whether the user intended to invoke a movie playback skill or a music playback skill, as a movie and a soundtrack for the movie may be identified using the same name. Accordingly, the decider engine 332 may determine that the top two hypotheses of ranking component 320 are equally likely (or approximately equally likely) and may determine that a question should be asked to disambiguate between the two possible actions. Accordingly, the routing plan 334 may route the input data to the dialog skill 352, and the dialog skill 352 may inquire whether the user intended to play the movie or the soundtrack.

In another example, the decider engine 332 may determine that the user was not satisfied with the top hypothesis of the ranking component 320 (e.g., due to explicit or implicit feedback received from the user in response to taking an action associated with the top ranking component 320 hypothesis). Accordingly, the decider engine 332 may determine that the routing plan 334 should be to determine the second highest ranked hypothesis of the ranking component 320.

If a skill 191 outputs natural language text in response to processing, the orchestrator may send the text to TTS component 336 for output as audio representing the speech.

Figure 4:
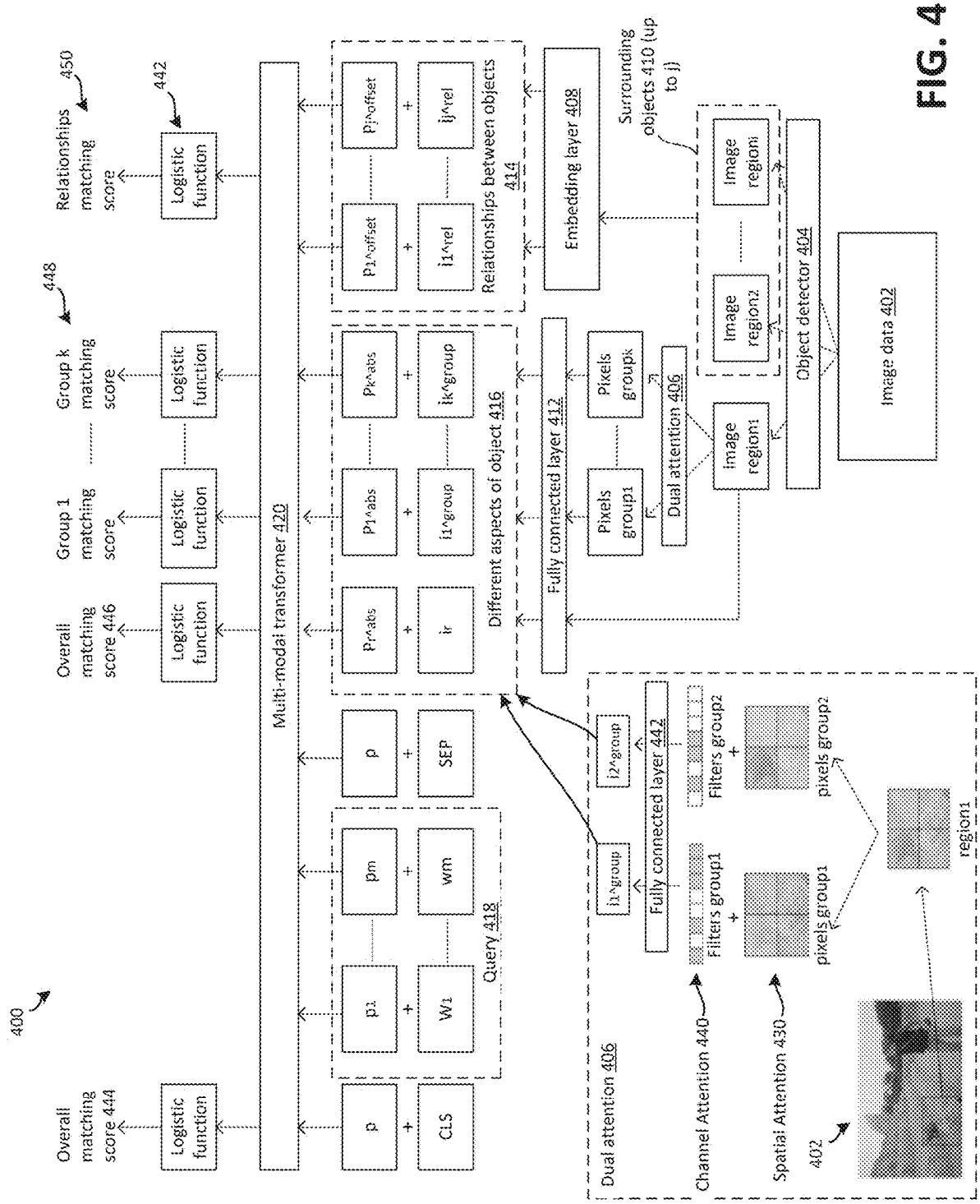
FIG. 4 depicts a block diagram illustrating an example machine learning architecture of a system configured to select objects in image data based on natural language input, in accordance with various aspects of the present disclosure.

FIG. 4 depicts a block diagram 400 illustrating an example machine learning architecture of a visual grounding system configured to select objects in image data based on natural language input, in accordance with various aspects of the present disclosure. Image data 402 may be an input frame of image data (e.g., a frame of a video that a user is currently watching). Query 418 may be a word embeddings representing a user's natural language input. The user's natural language input may pertain to the video that the user is watching and/or image that the user is viewing. As previously described, the embedding data of query 418 may be generated using a pre-trained language model. The embedding data representing the query 418 may comprise word or subword tokens $w_1 \ldots w_m$ along with respective positional tokens $p_1 \ldots p_m$ which represent positions of the tokens in the input into the multi-modal transformer 420. The CLS token may be a start token indicating the start of a new input. The SEP token may indicate a separation of the input data between the embedding data that relates to the natural language data (e.g., to the query 418) and the embedding data that relates to the input image (e.g., image data 402).

Object detector 404 may take image data 402 as input and may generate one or more RoIs depicted in FIG. 4 as Image region$_1$, Image region$_2$ . . . . Image region$_i$. Each image region may represent an object detected by the object detector 404. Each image region may comprise visual feature data semantically representing the image data corresponding to that image region (including the respective object).

The process of identifying/selecting an object represented in image data based on a natural language query that describes the object of interest is sometimes referred to as visual grounding. Visual grounding (such as that performed by multi-modal transformers 170, 420) can be utilized in numerous multi-modal use cases, including item selection and voice-based navigation. Visual grounding can also be combined with other models to build solutions for more complex use cases, such as visual question and answering with multi-modal graphs.

In various visual grounding approaches, the image may be input into an object detector (e.g., Faster RCNN, YOLO, etc.), which identifies the different objects, and produces visual feature data describing each such object. As previously described, the query 418 is input into a separate language model (e.g., a bi-LSTM or a word embedding model), and then these two embeddings are fused in a multi-modality network (e.g., multi-modal transformer 420). The multi-modal transformer 420 (e.g., a neural network) generates the final classification score that represents the match between a specific object in the image and the input query. In various examples, integrating pre-trained embedding layers and models into this general framework can significantly improve the visual grounding performance. Accordingly, many multi-modal transformers are pre-trained via masked language and masked image modeling.

As previously described, multi-modal transformers 170, 420 allow both visual and linguistic embedded features as inputs. That is, each input either represents a word from the query (e.g., via a WordPiece embedding), or a region-of-interest (RoI) from the input image that has been identified by object detector 404 (e.g., Faster R-CNN). Through a multi-head self-attention mechanism, the different layers of the multi-modal transformer 420 aggregate information from all of the elements. By stacking multiple layers of these multi-modal transformer attention modules, a rich representation that aggregates and aligns visual-linguistic clues is obtained as the final output. During inference, task-specific branches can be utilized at the last layer for various visual-linguistic tasks.

Many visual grounding approaches use a single cross-modal transformer to fuse information from image and language inputs. However, in various other implementations (e.g., VILBERT and LXMERT), two transformers are used followed by a co-attentional transformer layer to generate joint representations. In some other examples, object tags detected in images may be used as anchor points to significantly ease the learning of alignment. In another example, Pixel-BERT replaces region features with grid features, which relieves the cost of bounding box annotations and produces detailed visual representations. In other examples, the model may be pre-trained on datasets with scene graph annotations to construct detailed semantic connections across vision and language.

In various examples, the semantic meanings of visual features may be used to improve visual grounding performance. Different channels of the visual feature data computed by the visual network (e.g., object detector 404) correspond to different patterns in the input image data. Further, each channel signals the existence of a different type of object. Moreover, certain channels are related to specific colors and similar attributes. If such attributes are fed separately to the network, the visual transformer (e.g., multi-modal transformer 420) is better able to relate these attributes in the query to their regions-of-interest in the multi-modal transformer's self-attention scheme, improving accuracy. In various examples, the network is not supplied with information on the properties of each visual channel, and may instead be trained to find the optimal clustering pattern for the provided data. This results in a semi-supervised learning setup in which the neural network implicitly learns which channels of the visual input relate to which attributes in the query.

The block diagram 400 illustrating an example visual grounding system comprises a dual attention component 406. Additionally, the example visual grounding system determines relative location data (e.g., relationships between objects 414). Finally, the example visual grounding system may be trained using sub-group matching scores to allow the neural network to implicitly learn which channels of the visual input relate to which attributes in the query 418.

Dual attention component 406 is now described. Some visual grounding models directly feed the tokenized query and regions-of-interest (RoI) inputs into the multi-modal transformer model. In the example depicted in FIG. 4, dual attention component 406 may group pixels within an RoI, and may select the most appropriate visual feature data for each group of pixels. As detailed previously, each pixel group (e.g., each "group") captures a different type of visual semantics. For this goal, dual attention component 406 implements both spatial attention and channel attention.

In spatial attention 430, each image region (e.g., Image region$_1$, Image region$_2$ . . . . Image region$_i$) is divided into K grid locations. Spatial attention 430 clusters pixel grid locations into groups and generate a new vector representation for each group. More specifically, $V \in \mathbb{R}^{G \times d}$ represents visual feature data representing an RoI. Attention scores $a \in \mathbb{R}^{G \times K}$ are computed for each grid location with $a = \sigma(VC^T)$, where $\sigma(\cdot)$ is the sigmoid function and $C \in \mathbb{R}^{K \times d}$ represents a matrix that consists of K cluster centroids. The centroids (centroid feature values) are latent variables fit to the data on which the object detector 404 has been trained. Each cluster centroid represents a feature value (in the same space as the visual feature data V) that abstractly represents a specific object type or object attribute. The visual representation of the k-th pixel group is given by $V^k$ with $$V^k_{i,j} = a_{i,k} V_{i,j}.$$

Accordingly, k pixel groups are generated representing the same RoI (e.g., Image region$_1$), but with different visual features emphasized using attention. In various examples, the output of the spatial attention 430 may be spatial attention maps that represent the spatial attention scores a applied to the input visual feature values V.

In channel attention 440, guided attention over the channels of the object detector 404 are used to capture the various visual semantic components. For example, the spatial information of the visual feature of k-th group, $V_k$ may be aggregated using max-pooling operations into a down-sampled representation of lower dimensionality, giving $$V_k^{max}$$

(e.g., a down-sampled feature value). Then, the max-pooled descriptors (e.g., pooled feature values) are forwarded to a multi-layer perceptron (MLP) (e.g., fully connected layer 412) parameterized by $W \in \mathbb{R}^{d \times d}$. The channel attention score for group k, $b_k \in \mathbb{R}^{d \times 1}$, is computed with $$b_k = \sigma(V_k^{max} W).$$

Then, as in spatial attention 430, the visual features, $V_k$ are multiplied with the weights $b_k$ and are passed to the transformer. Channel attention 440 is performed for each filter channel of the object detector 404. In various examples, the output of the channel attention 440 may be channel attention maps that represent the attention scores $b_k$ applied to the spatial attention maps $V^k$.

In FIG. 4 the channel and spatial attention weighted visual features $b_k V_k$ are denoted as $i_1 \wedge$group, $i_2 \wedge$group, ..., $i_k \wedge$group. $P_1 \wedge$abs, ..., $P_k \wedge$abs represents the absolute location of the particular group in the frame of image data. $i_r$ represents the original visual feature data V of the image region$_1$.

In order to determine spatial relationships between objects 414, RoIs (e.g., Image region 2 ... image region i) representing objects around the current RoI (e.g., image region 1) may be input into the multi-modal transformer 420 with offset coordinates (relative to image region 1) to provide spatial context information. More specifically, for the j-th surrounding object 410 of the RoI (e.g., image region 1), the offset coordinates are calculated by mapping the 4-d vector $$\left[ \frac{[\Delta x_{tl}]_j}{w_j}, \frac{[\Delta y_{tl}]_j}{h_j}, \frac{[\Delta x_{br}]_j}{w_j}, \frac{[\Delta y_{br}]_j}{w_j} \right]$$

into a high-dimensional representation $$p_j^{offset},$$

which is concatenated with its visual feature i. Here, $(x_{tl}, y_{tl})$ and $(x_{br}, y_{br})$ denote the coordinate of the top-left and bottom-right corner of a surrounding object, respectively. For each such element, visual features representing the object are aggregated. The aggregated visual features the object, the type/classification of the object, and relative position of the object may be combined to build the final embedding feature (e.g., using embedding layer 408) for each of the surrounding objects.

Thereafter, the embedding data representing the query 418 and the image data 402 (e.g., embedding data representing different aspects of object 416 including the group attention maps, visual feature data, and the relative location data illustrating relationships between objects 414) may be input into multi-modal transformer 420. The output of the multi-modal transformer 420 may be a Softmax layer comprising a plurality of logistic functions 442 for each different group. The Softmax layer may output an overall matching score 446 indicating, for the current RoI (e.g., Image region 1) the overall matching score with respect to the natural language input (e.g., query 418). Additionally, individual group matching scores 448 may be generated for each attention map. Further, a relationships matching score 450 may be generated to represent the relationship (e.g., the spatial offset) between the current object and the surrounding objects. These sub-group matching scores may be utilized in an additional loss during training. For example, a matching score between each visual information group and the query may be determined (e.g., group matching scores 448). Cross-entropy loss may be used to train the multi-modal transformer 420 (and/or object detector 404 if trained end-to-end). In some other examples, contrastive loss functions may be used. The sub-group matching scores are used to compare the query 418 to each of the group matching scores 448. During training, negative training examples may be provided by augmenting the training data. For example, a given query may describe a color of an object. Accordingly, a group that corresponds to the visual feature describing color (generated via the spatial and/or channel attention techniques described above) may be associated with a high, ground truth group matching score 448. Additionally, an augmented training instance may be generated by removing the color terms from the query and by setting the group matching score 448 for the particular group to zero. In various examples, overall matching score 444 may represent the overall score for the selected object (e.g., the object in Image region$_1$) for the query 418.

Figure 5:
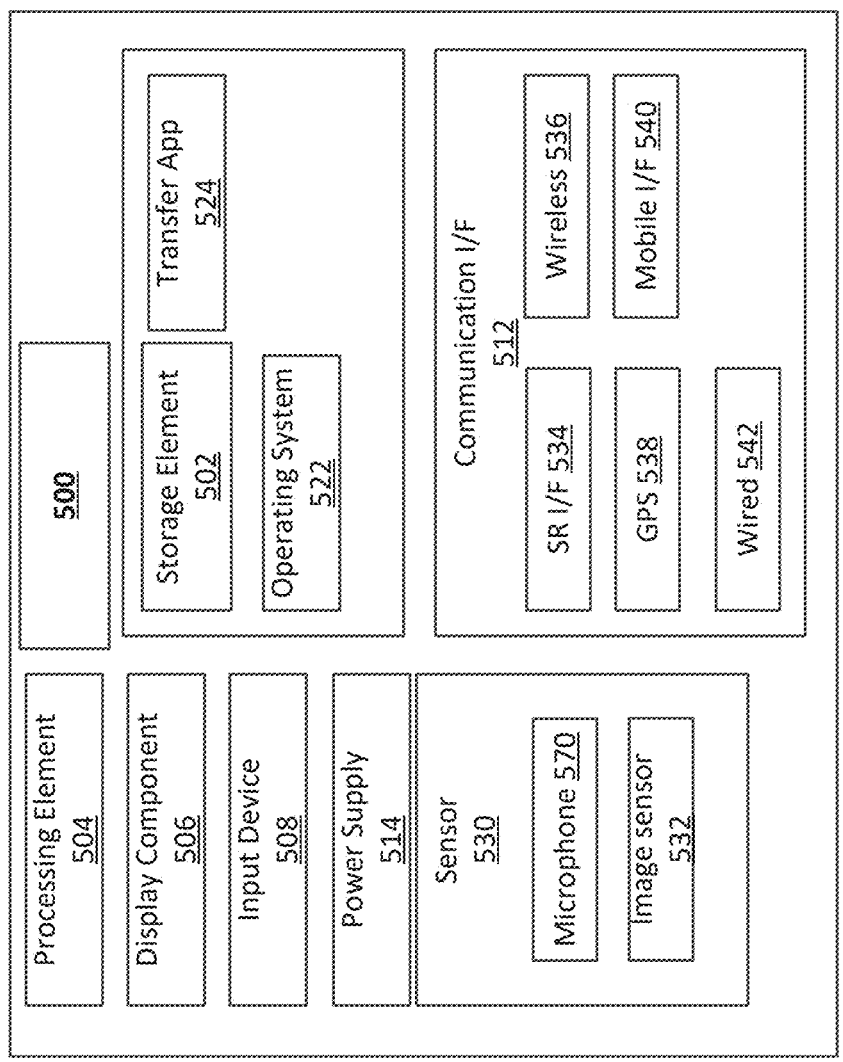
FIG. 5 is a block diagram showing an example architecture of a computing device that may be used in accordance with various embodiments described herein.

FIG. 5 is a block diagram showing an example architecture 500 of a computing device that may be used to access and/or implement one or more components of natural language processing system 120 and/or system 100, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models used in natural language processing (and/or parameters thereof), various NLU models, knowledge graphs, response templates, FSTs, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the natural language processing system 120, as described herein, are exemplary, and may be located as a stand-alone device or may be included, in whole or in part, as a component of a larger device or system.

Figure 6:
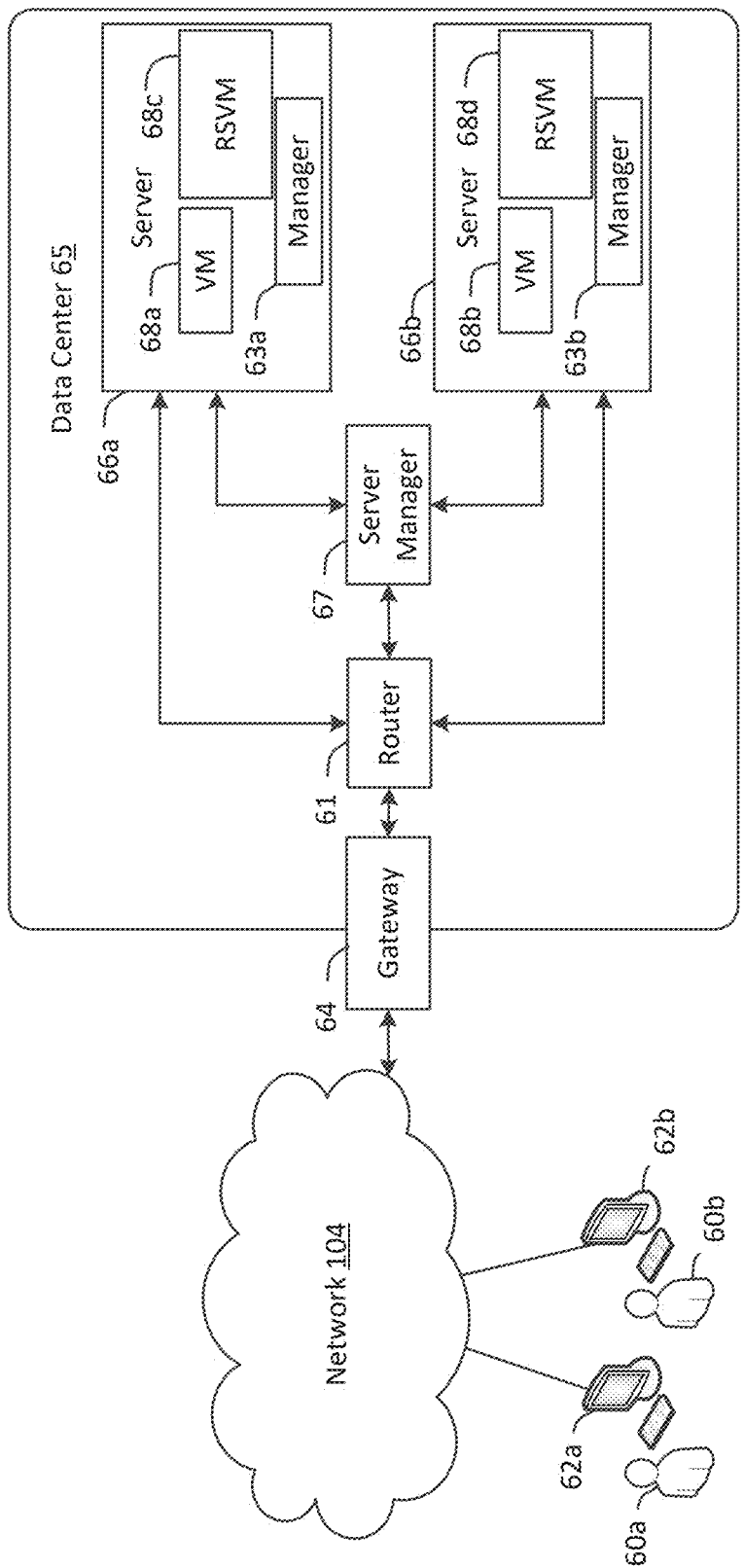
FIG. 6 is a diagram illustrating an example system for sending and providing data that may be used in accordance with the present disclosure.

An example system for sending and providing data and processing data of natural language processing systems will now be described in detail. In particular, FIG. 6 illustrates an example computing environment in which the embodiments described herein may be implemented. For example, the computing environment of FIG. 6 may be used to provide natural language processing as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various natural language processing techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway, or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Figure 7:
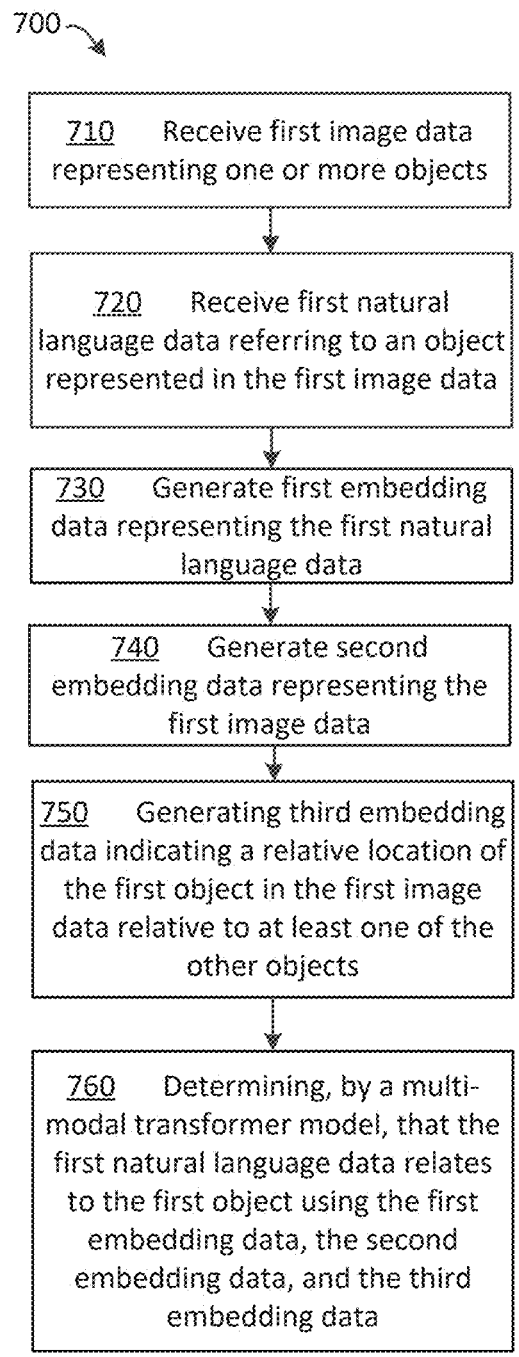
FIG. 7 depicts a flow chart showing an example process for selecting objects in image data based on natural language input, in accordance with various aspects of the present disclosure.

FIG. 7 depicts a flow chart showing an example process 700 for selecting objects in image data based on natural language input, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, at which first image data representing one or more objects may be received. In various examples, the image data may correspond to image data being viewed by a user and with which the user wishes to interact using an interface configured to receive natural language inputs. For example, the user may wish to interact with the image data using a voice-controlled interface and/or some other interface (e.g., text entered into a GUI via a keyboard). As previously described, in various examples the first image data may be one or more constituent frames of a video being watched by the user.

Processing may continue to action 720, at which first natural language data referring to an object represented in the first image data may be received. For example, a user may issue a command and/or request to a voice interface that refers to some object or objects depicted in the first image data. The natural language data may be a request for information about an object (e.g., a request for information about an actor and/or character in a television show), a request to purchase the object, a request to select the object (e.g., for navigation within an interface), to control the object (e.g., a player-controlled object in a video game), etc.

Processing may continue to action 730, at which first embedding data representing the first natural language data may be generated. For example, a pre-trained language model (e.g., Word2vec, etc.) may be used to generate embedding data that represents the first natural language data in an embedding space. The embedding space may be the embedding space defined for inputs into a multi-modal transformer model. In various examples, the embedding data representing the first natural language data may be downsampled and/or in a lower dimensional space relative to the first natural language data itself.

Processing may continue to action 740, at which second embedding data representing the first image data may be generated. For example, a CNN may be used to generate visual feature data representing the first image data (from action 710). The CNN may use various convolutional layers, pooling/sub-sampling layers, and/or a classifier (e.g., a fully-connected layer(s)) to generate feature data that represents the visual semantics of the input image data, as known to those skilled in the art.

Processing may continue at action 750, at which third embedding data may be generated indicating a relative location of the first object in the first image data relative to at least one of the other objects. At action 750, relative location data may be determined that indicates a relative location of the first object in the image data relative to one or more other objects represented in the image data. The relative location data may comprise offsets of the other objects relative to the first object. The offsets may be coordinates describing each surrounding object. The visual feature data representing the object, the classification of the object (e.g., by the object detector), and the relative position of the object may be combined (e.g., concatenated) to generate the third embedding data.

Processing may continue at action 760, at which a determination may be made by a multi-modal transformer model that the first natural language data relates to the first object using the first embedding data, the second embedding data, and the third embedding data. For example, the first embedding data, second embedding data, and third embedding data may be input into the multi-modal transformer 420. The multi-modal transformer 420 may generate scores for each of the objects detected in the image data (e.g., by object detector 404). In various examples, the object corresponding to the highest score may be determined to be the first object to which the user was referring in the first natural language data. Accordingly, data representing the first object may be used for further processing. For example, visual feature data representing the first object may be used to perform a visual search for similar objects. A graphical control element of a GUI representing the first object may be selected on the basis of the first natural language data. In some other examples, a knowledge graph may be searched to determine metadata related to the selected first object, in accordance with the user's request. For example, upon determining that the user has selected a first object, a determination may be made (e.g., by NLU component 160) that the first natural language data is requested some information about the first object. A knowledge graph may be traversed (e.g., using data identifying the first object such as an object name) to determine the requested information.

Figure 8:
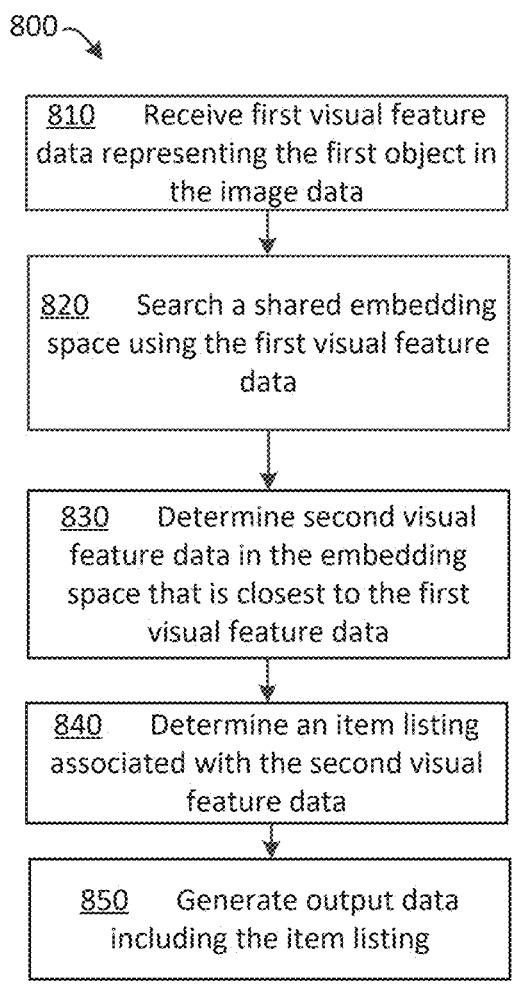
FIG. 8 depicts a flow chart showing an example process for determining item-listing data related to an object depicted in an image, in accordance with various aspects of the present disclosure.

FIG. 8 depicts a flow chart showing an example process 800 for determining item listing data related to an object depicted in an image, in accordance with various aspects of the present disclosure. Those portions of FIG. 8 that have been previously discussed in reference to FIGS. 1-7 may not be described again for purposes of clarity and brevity. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 800 of FIG. 8 may begin at action 810, at which first visual feature data representing the first object tin the image data may be received. For example, after selecting a particular object using the techniques described above (in reference to FIG. 7, for example), first visual feature data representing the object may be received. The visual feature data may semantically represent the object in a multi-dimensional feature space. For example, the visual feature data may represent shapes of various attributes of the object. For example, if the object is a dog, visual feature data may represent the dogs nose, the color of the dog's fur, the dog's tongue, etc. It should be appreciated that feature data is learned during the machine learning process of a CNN, so while particular human-perceivable feature attributes are described above for ease of illustration, in reality the features may be more abstract features interpretable by the CNN for classification tasks.

Processing may continue to action 820, at which a shared embedding space may be searched using the first visual feature data. For example, the first visual feature data (e.g., a feature map such as a tensor, matrix, and/or vector representing the first object) may be used as a search input into a feature space that corresponds (e.g., in terms of a number of dimensions) to the first visual feature data.

Processing may continue to action 830, at which second visual feature data may be determined. The second visual feature data may be the closest visual feature data to the first visual feature data in the shared embedding space. Various techniques are known for determining the distance between feature data in a shared feature space. For example, cosine similarity, Euclidean distance, and/or any other distance techniques in a metric space may be used to determine the closest feature data (e.g., the second visual feature data) in the feature space to the first visual feature data. In some examples, there may be a match between the first visual feature data in the second visual feature data. For example, if the first object matches some object in a database that is being searched, there may be a match (or close correspondence) between the first visual feature data and second visual feature data that represents the matching item in the database.

Processing may continue to action 840, at which an item listing may be determined. The item listing may be associated with the second visual feature data. In an example, the second visual feature data may represent an image of a particular object. The image of the particular object may, in turn, be associated with one or more item listings (e.g., in an e-commerce catalog and/or other database of image data).

Processing may continue to action 850, at which output data including the item listing may be determined. For example, the item listing corresponding to the second visual feature data may be displayed and/or otherwise output to the user. In an example, the user may be watching a video in which an item of interest to the user is displayed. The user may wish to purchase the item. Accordingly, the user may say "Computer, how can I buy that yellow shirt?" In response, image data representing the relevant frame of the video and data representing the user's utterance may be sent to the system 100, as described herein. The system 100 may determine that the user's utterance refers to the portion of image data representing the yellow shirt, as described herein. Thereafter, a data representation of the yellow shirt (e.g., visual feature data) may be used to search an image database for the most similar items, as described above. Thereafter, the most similar item in the image database (e.g., an e-commerce site) and/or a ranked list of the most similar items may be presented to the user so that the user may purchase the items.

Figure 9:
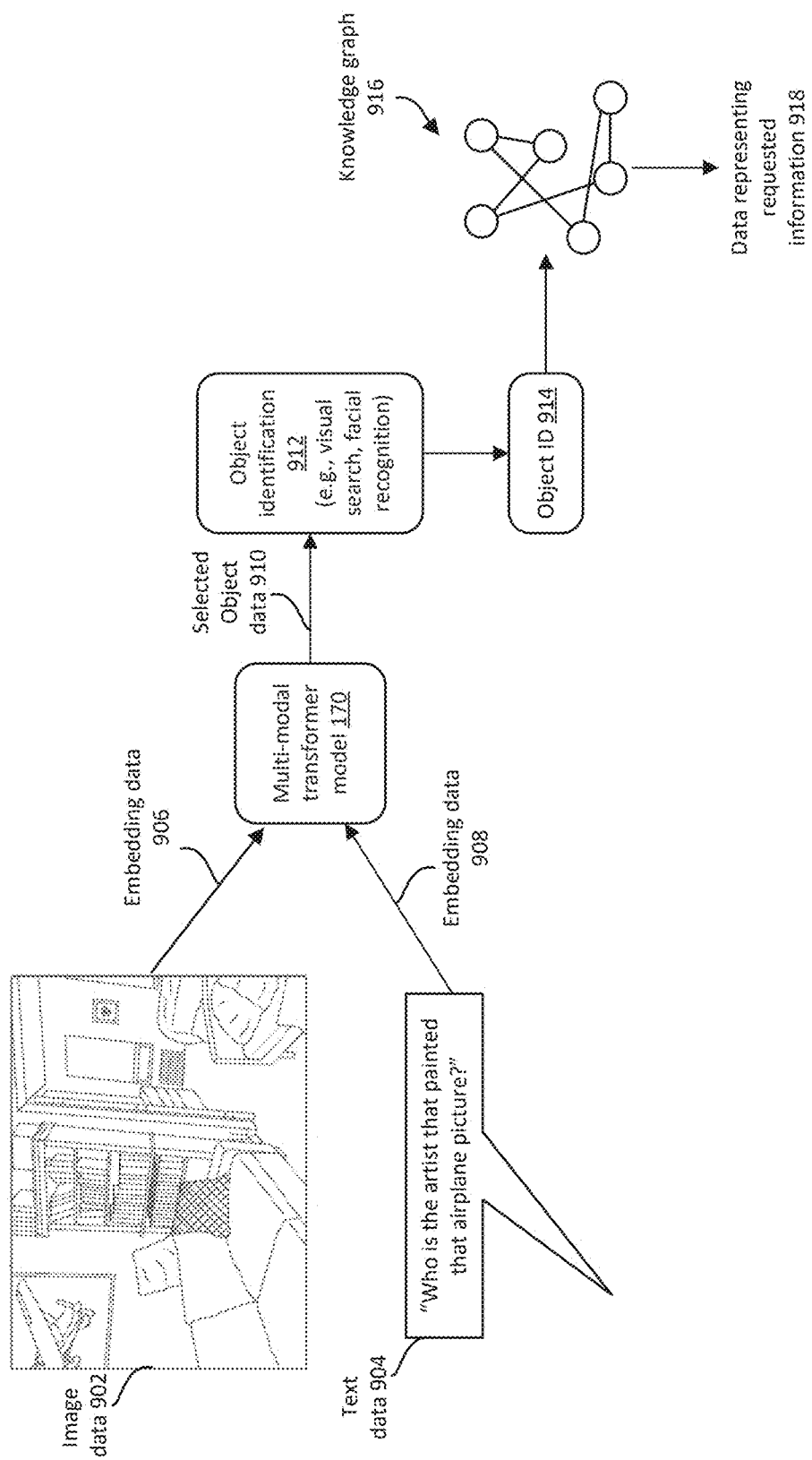
FIG. 9 depicts an example process for selecting an object in image data based on a natural language input and searching a knowledge graph for information about the selected object, in accordance with various aspects of the present disclosure.

FIG. 9 depicts an example process for selecting an object in image data based on a natural language input and searching a knowledge graph for information about the selected object, in accordance with various aspects of the present disclosure. Image data 902 may be received along with text data 904. Text data 904 may pertain to one or more objects represented in the image data 902. In some examples, text data 904 may be generated from audio data representing a user request using ASR component 150 (FIG. 3). In the example depicted in FIG. 9, a user may be asking who the artist is that painted a picture appearing in the image data 902. The image data 902 may be a frame of image data displayed on a display of a device. For example, the image data 902 may be displayed as part of a video that the user is watching.

As previously described above, embedding data 906 representing the image data 902 may be generated. The embedding data 906 may comprise visual feature representations of the image data 902, attention maps generated using the dual attention component 406, relative location data, etc. The embedding data 906 may be input into multi-modal transformer model 170. Similarly, embedding data 908 may be generated and input into multi-modal transformer model 170. Embedding data 908 may semantically represent the input text data 904 and may be generated using various language models (e.g., Word2Vec, WordPiece, etc.).

The multi-modal transformer model 170 (e.g., a modified version of VL-BERT or some other transformer network modified to use dual attention, relative location information, and sub-group matching scores, as described herein) may receive embedding data 906 and embedding data 908 and may select object data 910. The selected object data 910 may be the object predicted by multi-modal transformer model 170 to which the text data (and ultimately the user request) refers. The selected object data 910 may be the actual pixel data of the portion of the image corresponding to the object (e.g., an RoI that includes the object output by the object detector 404) and/or may be visual feature data representing the selected object (generated by one or more convolutional layers of a CNN of the object detector 404).

In some examples, the selected object data 910 may be input into an object identification system 912. The object identification system 912 may be an algorithm that is configured to generate object identification data 914. For example, the object identification system 912 may include a visual search algorithm that searches for a similar image to the image represented by the selected object data 910. The name of the similar image (or a matching image) and/or data identifying the similar image may be output as object ID 914. In another example, the selected object data 910 may represent a person (e.g., an actor in a movie). Object identification system 912 may include a facial recognition algorithm effective to determine an identity of the person represented by selected object data 910. In such an example, the object ID 914 may be the person's name and/or data such as an account number identifying the individual. In some examples, the video may include metadata indicating the names of actors and/or objects. In such cases, the selected object data 910 may be used to perform a lookup to determine the name of the actor and/or object. In such an example, the object ID 914 may be the name of the actor, character, object, place, etc.

In various examples, the object ID 914 may be used as query to a knowledge graph 916. The query may be constructed according to intent data generated by NLU component 160 and may include the object ID 914 as NER data. To continue the example above, the object ID may be a name of the painting (e.g., the "airplane picture"). Intent data generated by NLU component 160 may determine that the user wants to know some attribute about the object selected by the multi-modal transformer.

For example, the user may want to know the artist (e.g., requested attribute=artist) who painted the picture. Accordingly, a graph search query (e.g., search query data) may be generated to search the knowledge graph to determine an artist associated with object ID 914 which indicates the name of the painting. Accordingly, the artist that is associated with the name of the painting may be determined by traversing knowledge graph 916 (e.g., performing a graph search) and returned as the requested attribute data. The data representing the requested information 918 (e.g., the artist's name) may be output to the user (e.g., via TTS component 336) and/or may be displayed on a screen to the user.

Figure 10:
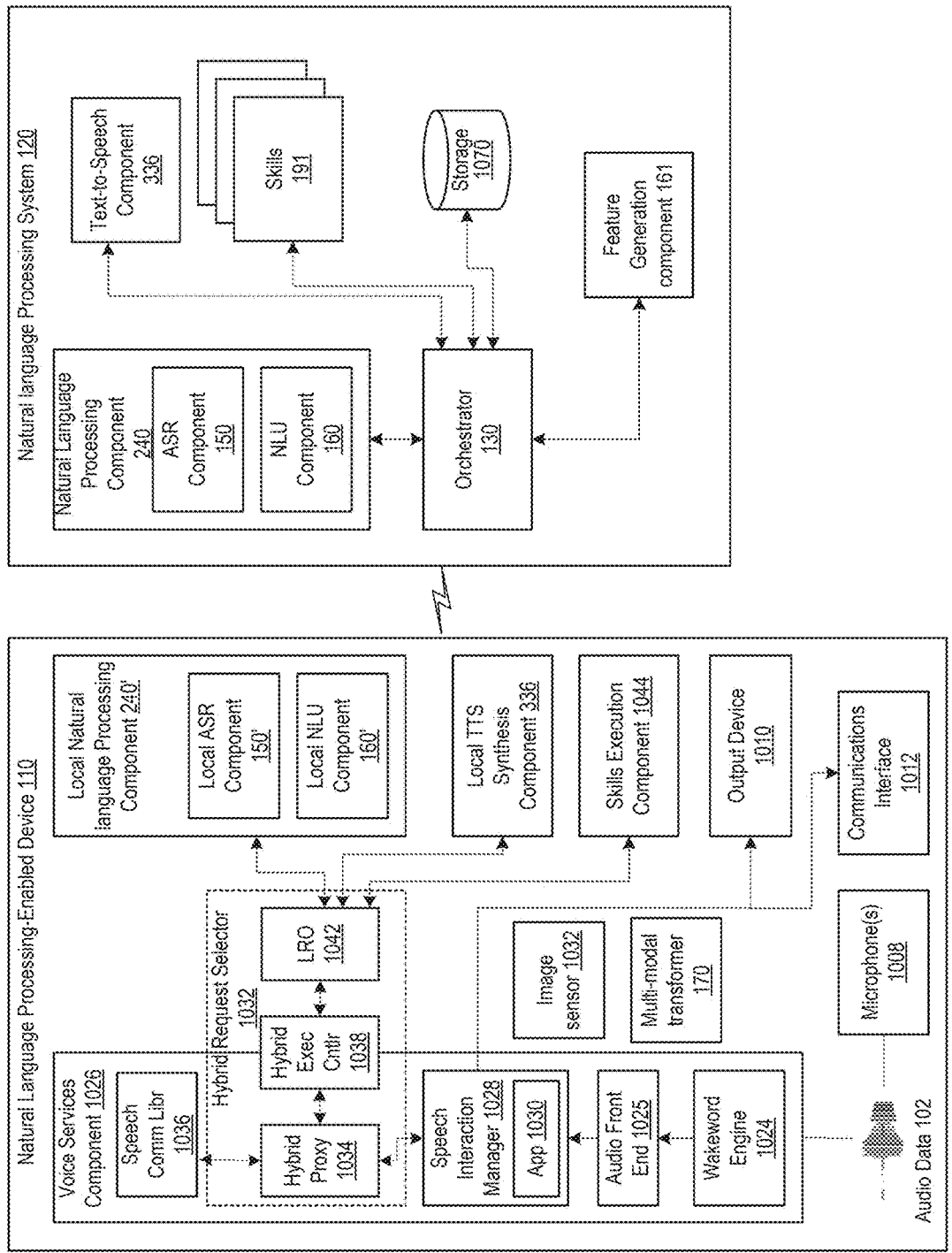
FIG. 10 is a block diagram illustrating a speech processing-enabled device and a speech processing management system, in accordance with embodiments of the present disclosure.

FIG. 10 is a block diagram illustrating a natural language processing-enabled device 110 and a natural language processing system 120, in accordance with embodiments of the present disclosure. Natural language processing-enabled device 110 may include microphones 1008 (e.g., far-field microphone arrays) used to transform audio into electrical signals. Natural language processing may then be performed, either locally by the natural language processing-enabled device 110, by one or more other computing devices communicating with the natural language processing-enabled device 110 over a network (e.g., natural language processing system 120), or by some combination of the natural language processing-enabled device 110 and the one or more other computing devices. In various examples, natural language processing-enabled device 110 may include and/or may be configured in communication with output device(s) 1010 (e.g., speakers and/or displays) effective to output information obtained in response to a user's spoken request or command, or to output content that may be of interest to one or more users. As used herein, a display of natural language processing-enabled device 110 refers to a display effective to output graphics such as images and/or video. Further, as used herein, a displayless device refers to a device that does not include a display that is effective to render graphical images or text.

A natural language processing enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 1008 to capture utterances and convert them into digital audio data 102, the natural language processing-enabled device 110 may additionally, or alternatively, receive audio data 102 (e.g., via the communications interface 1012) from another device in the environment. In various examples, the natural language processing-enabled device 110 may capture video and/or other image data using an image sensor 1032. Under normal conditions, the natural language processing-enabled device 110 may operate in conjunction with and/or under the control of a remote, network-based or network-accessible natural language processing system 120. The natural language processing system 120 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 120 may be configured to provide particular functionality to large numbers of local (e.g., in-home, in-car, etc.) devices of different users. The WAN is representative of any type of public or private, wide area network, such as the Internet, which extends beyond the environment of the natural language processing-enabled device 110. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 120 may be configured to receive audio data 102 from the natural language processing-enabled device 110, to recognize speech in the received audio data 102, and to perform functions in response to the recognized speech. In some embodiments, these functions involve sending a command, from the natural language processing system 120, to the natural language processing-enabled device 110 to cause the natural language processing-enabled device 110 to perform an action, such as output an audible response to the user speech via output device 1010 (e.g., one or more loudspeakers). Thus, under normal conditions, when the natural language processing-enabled device 110 is able to communicate with the natural language processing system 120 over a WAN (e.g., the Internet), some or all of the functions capable of being performed by the natural language processing system 120 may be performed by sending a command over a WAN to the natural language processing-enabled device 110, which, in turn, may process the command for performing actions. For example, the natural language processing system 120, via a remote command that is included in remote response data, may instruct the natural language processing-enabled device 110 to output an audible response (e.g., using a local text-to-speech (TTS) synthesis component 336) to a user's question, to output content (e.g., music) via output device 1010 (e.g., one or more loudspeakers) of the natural language processing-enabled device 110, or to control other devices in the local environment (e.g., the user's home). It is to be appreciated that the natural language processing system 120 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the natural language processing-enabled device 110 may include a local voice services component 1026. When a user utterance including the wakeword is captured by the microphone 1008 of the natural language processing-enabled device 110, the audio data 102 representing the utterance is received by a wakeword engine 1024 of the voice services component 1026. The wakeword engine 1024 may be configured to compare the audio data 102 to stored models used to detect a wakeword (e.g., "Computer") that indicates to the natural language processing-enabled device 110 that the audio data 102 is to be processed for determining an intent. Thus, the wakeword engine 1024 is configured to determine whether a wakeword is detected in the audio data 102, and, if a wakeword is detected, the wakeword engine 1024 can proceed with routing the audio data 102 to an audio front end (AFE) 1025 (sometimes referred to as an acoustic front end (AFE)) of the voice services component 1026. If a wakeword is not detected in the audio data 102, the wakeword engine 1024 can refrain from sending the audio data 102 to the AFE 1025, thereby preventing the audio data 102 from being further processed. The audio data 102 can be discarded.

The AFE 1025 is configured to transform the audio data 102 received from the wakeword engine 1024 into data for processing by a suitable ASR component and/or NLU component. The AFE 1025 may reduce noise in the audio data 102 and divide the digitized audio data 102 into frames representing a time intervals for which the AFE 1025 determines a number of values, called features, representing the qualities of the audio data 102, along with a set of those values, called a feature vector, representing the features/qualities of the audio data 102 within the frame. Many different features may be determined, and each feature represents some quality of the audio data 102 that may be useful for ASR processing and/or NLU processing. A number of approaches may be used by the AFE 1025 to process the audio data 102, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 1025 is configured to use beamforming data to process the received audio data 102. Beamforming can be used to distinguish between the directions from which speech and noise originate. Accordingly, the microphones 1008 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 102, used by the AFE 1025 in beamforming, may be determined based on results of the wakeword engine 1024's processing of the audio data 102. For example, the wakeword engine 1024 may detect the wakeword in the audio data 102 from a first microphone 1008 at time, t, while detecting the wakeword in the audio data 102 from a second microphone 1008 a millisecond later in time (e.g., time, t+1 millisecond), and so on and so forth, for any suitable number of audio signals corresponding to multiple microphones 1008 in a microphone array.

A speech interaction manager (SIM) 1028 of the voice services component 1026 may receive the audio data 102 that has been processed by the AFE 1025. The SIM 1028 may manage received audio data 102 by processing request data and non-speech noise or sounds as events, and the SIM 1028 may also manage the processing of commands that are used to respond to the user speech or non-speech noise or sounds (e.g., by controlling the action(s) of the natural language processing-enabled device 110). The SIM 1028 may include one or more client applications 1030 for performing various functions at the natural language processing-enabled device 110.

A hybrid request selector component 1032 of the natural language processing-enabled device 110 is shown as including a hybrid proxy component (HP) 1034, among other components. The HP 1034 can be implemented as a layer within the voice services component 1026 that is located between the SIM 1028 and a speech communication library (SCL) 1036, and may be configured to proxy traffic to/from the natural language processing system 120. For example, the HP 1034 may be configured to pass messages between the SIM 1028 and the SCL 1036 (such as by passing events and instructions there between), and to send messages to/from a hybrid execution controller component (HEC) 1038 of the hybrid request selector component 1032. For instance, command data received from the natural language processing system 120 can be sent to the HEC 1038 using the HP 1034, which sits in the path between the SCL 1036 and the SIM 1028. The HP 1034 may also be configured to allow audio data 102 received from the SIM 1028 to pass through to the natural language processing system 120 (via the SCL 1036) while also receiving (e.g., intercepting) this audio data 102 and sending the received audio data 102 to the HEC 1038 (sometimes via an additional SCL).

As will be described in more detail below, the HP 1034 and the HEC 1038 are configured to perform a handshake procedure to connect to each other. As part of this handshake procedure, the HP 1034 and the HEC 1038 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 1038 determines whether to accept or reject the connection request from the HP 1034. If the HEC 1038 rejects the HP's 1034 connection request, the HEC 1038 can provide metadata to the HP 1034 that provides a reason why the connection request was rejected.

A local natural language processing component 240' (sometimes referred to as a "natural language processing component," a "spoken language understanding (SLU) component," a "speech engine," or an "engine") is configured to process audio data 102 (e.g., audio data 102 representing user speech, audio data 102 representing non-speech noise or sounds, etc.). In some embodiments, the hybrid request selector component 1032 may further include a local request orchestrator component (LRO) 1042. The LRO 1042 is configured to notify the local natural language processing component 240' about the availability of new audio data 102 that represents user speech, and to otherwise initiate the operations of the local natural language processing component 240' when new audio data 102 becomes available. In general, the hybrid request selector component 1032 may control the execution of the local natural language processing component 240', such as by sending "execute" and "terminate" events/instructions to the local natural language processing component 240'. An "execute" event may instruct the local natural language processing component 240' to continue any suspended execution based on audio data 102 (e.g., by instructing the local natural language processing component 240' to execute on a previously-determined intent in order to generate a command). Meanwhile, a "terminate" event may instruct the local natural language processing component 240' to terminate further execution based on the audio data 102, such as when the natural language processing-enabled device 110 receives command data from the natural language processing system 120 and chooses to use that remotely-generated command data.

The LRO 1042 may interact with a skills execution component 1044 that is configured to receive intent data output from the local natural language processing component 240' and to execute a skill based on the intent.

To illustrate how the natural language processing-enabled device 110 can operate at runtime, consider an example where a user utters an expression, such as "Computer, turn off the kitchen lights." The audio data 102 is received by the wakeword engine 1024, which detects the wakeword "Computer," and forwards the audio data 102 to the SIM 1028 via the AFE 1025 as a result of detecting the wakeword. The SIM 1028 may send the audio data 102 to the HP 1034, and the HP 1034 may allow the audio data 102 to pass through to the natural language processing system 120 (e.g., via the SCL 1036), and the HP 1034 may also input the audio data 102 to the local natural language processing component 240' by routing the audio data 102 through the HEC 1038 of the hybrid request selector 1032, whereby the LRO 1042 notifies the local natural language processing component 240' of the incoming audio data 102. At this point, the hybrid request selector 1032 may wait for response data from the natural language processing system 120 and/or the local natural language processing component 240'.

The local natural language processing component 240' is configured to receive the audio data 102 from the hybrid request selector 1032 as input, to recognize speech (and/or non-speech audio events) in the audio data 102, to determine an intent (e.g., user intent) from the recognized speech (or non-speech audio event). This intent can be provided to the skills execution component 1044 via the LRO 1042, and the skills execution component 1044 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 1044 (and/or the natural language processing system 120) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the WAN 105. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 150' that is configured to perform ASR processing on the audio data 102 to convert the audio data 102 into text data (sometimes referred to herein as "ASR text data," an "ASR result", or "ASR data"). ASR transcribes audio data 102 into text data representing the words of the user speech contained in the audio data 102. A spoken utterance in the audio data 102 can be input to the local ASR component 150', which then interprets the utterance based on the similarity between the utterance and pre-established language models available to the local natural language processing component 240'. In some embodiments, the local ASR component 150' outputs the most likely text recognized in the audio data 102, or multiple hypotheses in the form of a lattice or an N-best list with individual hypotheses corresponding to confidence scores or other scores (such as probability scores, etc.). In some embodiments, the local ASR component 150' is customized to the user (or multiple users) who created a user account to which the natural language processing-enabled device 110 is registered. For instance, the language models (and other data) used by the local ASR component 150' may be based on known information (e.g., preferences) of the user, and/or on a history of previous interactions with the user.

The local natural language processing component 240' may also include a local NLU component 160' that performs NLU processing on the generated ASR text data to determine intent data and/or slot data (referred to herein as a "NLU result", or "NLU data") so that directives may be determined (e.g., by the skills execution component 1044) based on the intent data and/or the slot data. Generally, the local NLU component 160' takes textual input (such as text data generated by the local ASR component 150') and attempts to make a semantic interpretation of the ASR text data.

Natural Language Processing System

In other situations, the natural language processing-enabled device 110 may send the audio data 102 to the natural language processing system 120 for processing. As described above, the natural language processing-enabled device 110 may capture audio using the microphone 1008, and send audio data 102 (e.g., representing a spoken user request), corresponding to the captured audio, to the natural language processing system 120. The natural language processing-enabled device 110 may include a wakeword detection component that detects when input audio includes a spoken wakeword, and when the wakeword is detected, the audio data 102 is sent by the natural language processing-enabled device 110 to the natural language processing system 120.

Upon receipt by the natural language processing system 120, the audio data 102 may be sent to an orchestrator 130. The orchestrator 130 may include memory and logic that enables the orchestrator 130 to send various pieces and forms of data to various components of the system.

Similar to the operation described above with respect to the local natural language processing component 240' of the natural language processing-enabled device 110, the orchestrator 130 may send the audio data 102 to a natural language processing component 240. An ASR component 150 of the natural language processing component 240 transcribes the audio data 102 into one or more hypotheses representing speech contained in the audio data 102. The natural language processing component 240 interprets the speech in the audio data based on a similarity between the characteristics of the audio data corresponding to the speech and pre-established language models. For example, the natural language processing component 240 may compare the audio data 102 with models for sounds (e.g., subword units such as phonemes) and sequences of sounds to identify words that match the sequence of sounds in the speech represented in the audio data 102. The natural language processing component 240 may send text data generated thereby to an NLU component 160 of the natural language processing component 240. The text data output by the natural language processing component 240 may include a top scoring hypothesis of the speech represented in the audio data 102 or may include an N-best list including a group of hypotheses of the speech represented in the audio data 102, and potentially respective scores ASR processing confidence scores.

The NLU component 160 attempts to make a semantic interpretation of the phrases or statements represented in the text data input therein. That is, the NLU component 160 determines one or more meanings associated with the phrases or statements represented in the text data based on individual words represented in the text data. The NLU component 160 interprets a text string to derive an intent of the user (e.g., an action that the user desires be performed) as well as pertinent pieces of information in the text data that allow a device (e.g., the natural language processing system 120) to complete the intent. For example, if the text data corresponds to "Play the new album by [Musical_Artist]", the NLU component 160 may determine the user intended to invoke a music playback intent to play the identified album.

The natural language processing system 120 may include a non-transitory computer-readable memory 1070, storing various instructions for operation of the natural language processing system 120.

As described above, the natural language processing system 120 may include one or more skills 190. The natural language processing system 120 may also include a TTS component 336 that synthesizes speech (e.g., generates audio data) corresponding to text data input therein. The TTS component 336 may perform speech synthesis using one or more different methods. In one method of synthesis called unit selection, the TTS component 336 matches text data against one or more databases of recorded speech. Matching units are selected and concatenated together to form audio data. In another method of synthesis called parametric synthesis, the TTS component 336 varies parameters such as frequency, volume, and noise to create an artificial speech waveform output. Parametric synthesis uses a computerized voice generator, sometimes called a vocoder.

The various components of the natural language processing system 120 and the natural language processing-enabled device 110 described herein may be implemented in software, hardware, firmware, or some combination thereof.

The natural language processing system 120 may reside on natural language processing-enabled device 110, in a cloud computing environment, or some combination thereof. For example, the natural language processing-enabled device 110 may include computing equipment, some portion of which is configured with some or all of the components or functionality of natural language processing system 120 and another portion of which is configured with some or all of the components or functionality of computing device(s) used in natural language processing system 120. The natural language processing-enabled device 110 may then perform a variety of functions on its own (such as when remote communications are unavailable), and/or may communicate (when capable) with computing device(s) and/or the natural language processing system 120 to perform other functions. Alternatively, all of the functionality may reside on the natural language processing-enabled device 110 or remotely. Feature generation component 161 may generate feature data and/or embedding data as described above, in reference to FIGS. 1-5.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
receiving input query data comprising a word token;
receiving first image data;
generating first embedding data comprising the word token and a corresponding token based on the input query data;
identifying, by an object detector model, a first image region representing at least a first portion of the first image data, and a second image region representing at least a second portion of the first image data;
generating second embedding data comprising the first image region;
generating cluster centroid data representing the first image region;
generating a spatial attention score by applying a first activation function to a product of a representation of the first image region and the cluster centroid data;
generating a spatial attention map by multiplying the spatial attention score and the representation of the first image region;
generating a down-sampled spatial attention map by down-sampling the spatial attention map;
calculating a channel attention score by applying a second activation function to a product of the down-sampled spatial attention map and a channel attention weight,
generating a channel attention amp by multiplying the channel attention score and the representation of the first image region;
generating third embedding data comprising the channel attention map;
generating fourth embedding data comprising a representation of the second image region;
storing the first embedding data, the second embedding data, the third embedding data, and the fourth embedding data in at least one non-transitory computer readable memory;
inputting the first embedding data, the second embedding data, the third embedding data, and the fourth embedding data into a multi-modal natural language understanding model to determine an output score quantifying how the input query data relates to the first image region;
determining derived query data representing the first image region, wherein the derived query data comprises a search engine query;
inputting the derived query data into a search interface;
receiving a first search result from the search interface; and
outputting the first search result in response to the input query data.

2. The computer-implemented method of claim 1, further comprising:
determining third data based at least in part on a distance between the derived query data and the input query data in an embedding space;
determining an item listing associated with the derived query data; and
generating output data comprising the item listing.

3. The computer-implemented method of claim 1, further comprising:
sending the first image data to an object detector; and
determining location data identifying a location of the first image region in the first image data, wherein the second embedding data represents pixels of a portion of the first image data identified by the location data.

4. The computer-implemented method of claim 1, further comprising:
determining that the input query data represents a query about a first attribute of the first image region;
generating a graph search query comprising a first data identifying the first image region and second data comprising a request for the first attribute related to the first image region;
performing a graph search using the graph search query; and
determining attribute data representing the first attribute of the first image region.

5. The computer-implemented method of claim 1, further comprising:
determining that the first natural input query data comprises a request to select the first image region on a graphical user interface represented by the first image data; and
generating control input data effective to select the image region on the graphical user interface.

6. The computer-implemented method of claim 1, further comprising:
determining a latent variable associated with the first image region; and
determining the spatial attention score based at least in part on the latent variable.

7. The computer-implemented method of claim 1, further comprising:
determining second image data representing at least the second e image region, wherein the first image data and the second image data are included in a single frame of image data;
determining, for the first image data by the multi-modal natural language understanding model, a first score indicating a first probability that the input query data corresponds to the first image region; and
determining, for the second image data by the multi-modal natural language understanding model, a second score indicating a second probability that the input query data corresponds to the second image region, wherein the determining, by the multi-modal natural language understanding model, that the input query data relates to the first image region comprises determining that the first probability is greater than the second probability.

8. The computer-implemented method of claim 1, further comprising:
determining, using a first component configured to function as a recurrent neural network, word embeddings representing at least each word of the input query data, wherein the first embedding data comprises the word embeddings; and
determining, using a second component configured to function as a convolutional neural network, visual feature embeddings representing attributes of the first image data, wherein the second embedding data comprises the visual feature embeddings.

9. The computer-implemented method of claim 1, further comprising:
determining, by an object detector, a plurality of objects in the first image data, wherein each object of the plurality of objects corresponds to a respective image region by the object detector model; and
computing spatial attention and channel attention for each of the plurality of objects.

10. A system comprising:
at least one processor; and
at least one non-transitory computer-readable memory storing instructions that, when executed by the at least one processor, are effective to:
receive input query data comprising a word token;
receive first image data;
generate first embedding data comprising the word token and a corresponding positional token based on the input query data;
identify, by an object detector model, a first image region representing at least a first portion of the first image data, and a second image region representing at least a second portion of the first image data;
generate second embedding data representing the first image region;
generating cluster centroid data representing the first image region;
generate a spatial attention score by applying a first activation function to a product of a representation of the first image region and the cluster centroid data;
generate a spatial attention map by multiplying the spatial attention score and the representation of the first image region;
generate a down-sampled spatial attention map by down-sampling the spatial attention map;
calculate a channel attention score by applying a second activation function to a product of the down-sampled spatial attention map and a channel attention weight;
generate a channel attention map by multiplying the channel attention score and the representation of the first image region;
generate third embedding data comprising the channel attention map;
generate fourth embedding data comprising a representation of the second image region;
store the first embedding data, the second embedding data, the third embedding data, and the fourth embedding data in the at least one non-transitory computer-readable memory;
input the first embedding data, the second embedding data, the third embedding data, and the fourth embedding data into a multi-modal natural language understanding model to determine an output score quantifying how the input query data relates to the first image region;
determine derived query data representing the first image region, wherein the derived query data comprises a search engine query;
input the derived query data into a search interface;
receive a first search result from the search interface; and
output the first search result in response to the input query data.

11. The system of claim 10, the at least one non-transitory computer-readable memory storing further instructions that, when executed by the at least one processor, are further effective to:
determine third data based at least in part on a distance between the derived query data and the input query data in an embedding space;
determine an item listing associated with the derived query data; and
generate output data comprising the item listing.

12. The system of claim 10, the at least one non-transitory computer-readable memory storing further instructions that, when executed by the at least one processor, are further effective to:
send the first image data to an object detector; and
determine location data identifying a location of the first image region in the first image data, wherein the second embedding data represents pixels of a portion of the first image data identified by the location data.

13. The system of claim 10, the at least one non-transitory computer-readable memory storing further instructions that, when executed by the at least one processor, are further effective to:
determine that the input query data represents a query about a first attribute of the first image region;
generate a graph search query comprising a first data identifying the first image region and second data comprising a request for the first attribute related to the first image region;
perform a graph search using the graph search query; and
determine attribute data representing the first attribute of the first image region.

14. The system of claim 10, the at least one non-transitory computer-readable memory storing further instructions that, when executed by the at least one processor, are further effective to:
determine that the input query data comprises a request to select the first image region on a graphical user interface represented by the first image data; and
generate control input data effective to select the first image region on the graphical user interface.

15. The system of claim 10, the at least one non-transitory computer-readable memory storing further instructions that, when executed by the at least one processor, are further effective to:
determine a latent variable associated with the first image region; and
determine the spatial attention score based at least in part on the latent variable.

16. The system of claim 10, the at least one non-transitory computer-readable memory storing further instructions that, when executed by the at least one processor, are further effective to:
determine second image data representing at least the second image region, wherein the first image data and the second image data are included in a single frame of image data;
determine, for the first image data by the multi-modal natural language understanding model, a first score indicating a first probability that the input query data corresponds to the first image region; and
determine, for the second image data by the multi-modal natural language understanding model, a second score indicating a second probability that the input query data corresponds to the second image region, wherein the determining, by the multi-modal natural language understanding model, that the input query data relates to the first image region comprises determining that the first probability is greater than the second probability.

17. The system of claim 10, the at least one non-transitory computer-readable memory storing further instructions that, when executed by the at least one processor, are further effective to:
- determine, using a first component configured to function as a recurrent neural network, word embeddings representing at least each word of the input query data, wherein the first embedding data comprises the word embeddings; and
- determine, using a second component configured to function as a convolutional neural network, visual feature embeddings representing attributes of the first image data, wherein the second embedding data comprises the visual feature embeddings.

18. The system of claim 10, the at least one non-transitory computer-readable memory storing further instructions that, when executed by the at least one processor, are further effective to:
- determine, by an object detector, a plurality of objects in the first image data, wherein each object of the plurality of objects corresponds to a respective image region by the object detector model; and
- compute spatial attention and channel attention for each of the plurality of objects.

19. A method comprising:
- receiving input query data comprising a word token;
- receiving first image data;
- generating first embedding data comprising the word token and a corresponding positional token based on the input query data;
- identifying, by an object detector model, a first image region representing at least a first portion of the first image data, and a second imager region representing at least a second portion of the first image data;
- generating cluster centroid data representing the first image region;
- generating a spatial attention score by applying a first activation function to a product of a representation of the first image region and the cluster centroid data;
- generating a spatial attention map by multiplying the spatial attention score and the representation of the first image region;
- generating, for a first filter channel of the object detector model, a channel attention score using a pooled representation of the spatial attention map;
- generating, for the first image region, second embedding data by multiplying the representation of the first image region by the channel attention score;
- determining, by a multi-modal natural language understanding model using the first embedding data and the second embedding data, that the input query data relates to the first image region;
- determining first data representing the first image region;
- determining second data representing an action to take with respect to the first image region; and
- performing the action based at least in part on the first data and the second data.

20. The method of claim 19, further comprising:
- dividing a first subdivided image region corresponding to the second image region into K grid locations;
- determining visual feature data V representing a first grid location of the K grid locations;
- determining the spatial attention score a for the first grid location;
- determining a visual representation $V^k$ of the first grid location, where $V^k=aV$;
- down-sampling the visual representation $V^k$ to generate $V_k^{pooled}$;
- determining a channel attention score b for the first grid location using $V_k^{pooled}$, and
- determining a visual embedding bV for the first grid location by multiplying the channel attention score b by the visual feature data V.

* * * * *